(12) United States Patent
Berner et al.

(10) Patent No.: US 11,936,957 B2
(45) Date of Patent: Mar. 19, 2024

(54) METHOD AND SYSTEM FOR TRENDING MEDIA PROGRAMS FOR A USER

(71) Applicant: TIVO SOLUTIONS INC., San Jose, CA (US)

(72) Inventors: Mark Berner, Santa Clara, CA (US); Gabriel Dalbec, Morgan Hill, CA (US); James Yee Liang Cheng, Fremont, CA (US); Brian W. Beach, Columbia, IN (US)

(73) Assignee: TiVo Solutions Inc., San Jose, CA (US)

( * ) Notice: Subject to any disclaimer, the term of this patent is extended or adjusted under 35 U.S.C. 154(b) by 0 days.

(21) Appl. No.: 17/180,290

(22) Filed: Feb. 19, 2021

(65) Prior Publication Data

US 2021/0250657 A1   Aug. 12, 2021

Related U.S. Application Data

(63) Continuation of application No. 16/859,038, filed on Apr. 27, 2020, now Pat. No. 11,743,546, which is a
(Continued)

(51) Int. Cl.
*H04N 21/482*  (2011.01)
*H04N 21/414*  (2011.01)
*H04N 21/258*  (2011.01)

(52) U.S. Cl.
CPC ... *H04N 21/4826* (2013.01); *H04N 21/41407* (2013.01); *H04N 21/25891* (2013.01)

(58) Field of Classification Search
CPC ......... H04N 21/4826; H04N 21/41407; H04N 21/25891
See application file for complete search history.

(56) References Cited

U.S. PATENT DOCUMENTS 7,900,228 B2 *  3/2011  Stark ................. H04N 21/4828
                                                   725/39
8,683,518 B2    3/2014  Cuttner et al.
(Continued)

OTHER PUBLICATIONS

"Best of 2012: Top Lists of Trending and Popular Videos", [online], Jan. 4, 2013, [retrieved on Jul. 8, 2019], YouTube, LLC, retrieved from <URL: http://youtube-trends.blogspot.corn/2013/01/best-of-2012-top-lists-of-trending-and.htra>. (Year: 2013).

*Primary Examiner* — Jefferey F Harold
*Assistant Examiner* — Alexander Boyd
(74) *Attorney, Agent, or Firm* — Haley Guiliano LLP

(57) ABSTRACT

A client determines that a user is attempting to access media program recommendations. In response to the determination, the client attempts to collect media program recommendations to be presented to the user. Media program recommendations may be derived locally by the client, by the client and a multimedia device locally connected with the client, by the client and one or more additional devices, etc. In some embodiments, in response to receiving a query from the client, one or more recipient devices or servers identify media program recommendations in a plurality of trending categories. The media program recommendations may be selected based at least in part on EPG data and audience research and measurement data. The media program recommendations collected by the client are presented to the user for further exploration. The client may be one of mobile phones, tablet computers, etc.

27 Claims, 15 Drawing Sheets

Related U.S. Application Data continuation of application No. 15/710,392, filed on Sep. 20, 2017, now Pat. No. 10,674,221, which is a continuation of application No. 14/120,348, filed on May 14, 2014, now abandoned.

(60) Provisional application No. 61/823,316, filed on May 14, 2013.

(56) References Cited

U.S. PATENT DOCUMENTS

| | | | |
|---|---|---|---|
| 9,699,503 B2* | 7/2017 | Fishman | H04N 21/252 |
| 9,753,988 B1 | 9/2017 | McGilliard | |
| 9,772,737 B1 | 9/2017 | Killalea et al. | |
| 11,743,546 B2 | 8/2023 | Berner et al. | |
| 11,847,300 B2* | 12/2023 | Yurasits | G06F 3/0482 |
| 2006/0031882 A1 | 2/2006 | Swix et al. | |
| 2006/0095937 A1 | 5/2006 | Knudson et al. | |
| 2007/0039023 A1* | 2/2007 | Kataoka | H04N 21/4826 |
| | | | 725/35 |
| 2007/0136753 A1 | 6/2007 | Bovenschulte et al. | |
| 2008/0086456 A1 | 4/2008 | Rasanen et al. | |
| 2008/0134043 A1 | 6/2008 | Georgis et al. | |
| 2008/0141307 A1 | 6/2008 | Whitehead | |
| 2009/0248599 A1 | 10/2009 | Hueter et al. | |
| 2010/0094866 A1 | 4/2010 | Cuttner et al. | |
| 2011/0107220 A1* | 5/2011 | Perlman | H04L 65/401 |
| | | | 715/720 |
| 2011/0289534 A1 | 11/2011 | Jordan et al. | |
| 2011/0307913 A1 | 12/2011 | Wang et al. | |
| 2012/0063744 A1 | 3/2012 | Weintraub et al. | |
| 2012/0254910 A1* | 10/2012 | Donoghue | H04N 21/26258 |
| | | | 725/14 |
| 2012/0331494 A1 | 12/2012 | Pontual et al. | |
| 2013/0167168 A1* | 6/2013 | Ellis | H04N 21/25891 |
| | | | 725/12 |
| 2013/0204825 A1 | 8/2013 | Su | |
| 2013/0298175 A1 | 11/2013 | Agrawal et al. | |
| 2014/0223480 A1* | 8/2014 | Berry | H04N 21/4826 |
| | | | 725/40 |
| 2014/0298385 A1 | 10/2014 | Roberts et al. | |

* cited by examiner

METHOD AND SYSTEM FOR TRENDING MEDIA PROGRAMS FOR A USER

PRIORITY CLAIM

This application is a continuation of U.S. patent application Ser. No. 16/859,038, filed Apr. 27, 2020, which is a continuation of U.S. patent application Ser. No. 15/710,392, filed Sep. 20, 2017, now U.S. Pat. No. 10,674,221, which is a continuation of U.S. patent application Ser. No. 14/120,348, filed May 14, 2014, which claims benefit of U.S. Provisional Application No. 61/823,316, filed May 14, 2013, (expired), the entire contents of which are hereby incorporated by reference herein in their entireties.

FIELD OF THE INVENTION

The present invention relates to techniques for trending media programs for a user.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Programs and other content are broadcasted to multimedia devices, such as digital video recorders (DVRs) and other set top boxes, over a multitude of channels. Traditionally, the different channels represented the different frequency bands over which the programs were aired by local television stations. However, with the advent of digital television, televisions stations have largely switched to transmitting content using digitally processed and multiplexed signals, rather than analog signals.

In order for a multimedia device to present content associated with a particular television station, the multimedia device "tunes" to the channel upon which the television station transmits content. Multimedia devices will typically have a hardware or software component, referred to as a "tuner", which performs the task of tuning to particular channels. In the case of analog transmission, the tuner may filter incoming signals to only those signals traveling within the frequency band associated with a particular television station. In the case of digital television, the tuner demultiplexes the digital signal.

In some cases, television stations operate on virtual channels, channels that differ from the actual channel upon which the signal travels. For example, many digital television tuners use a virtual channel map (also referred to as a virtual channel table) to associate virtual channels to actual channels. As a result, users are able to access channels by employing an input device, such as a remote control, to instruct the multimedia device to tune to the channel associated with a particular virtual channel number. The multimedia device then maps the virtual channel number to an actual channel using the virtual channel map. As a result, a television station may be identified within the digital stream using one channel number, but branded for identification by users with a different channel number. For example, a television station identified by users as "Channel 8" may actually use channel 32 for the underlying transmission protocols and formats, such as ATSC, DVB, ISDB, etc.

In some cases, the content presented by each television station adheres to a particular theme or genre. For example, television stations may specialize in programs concerning local news, science fiction, sports, dramas, documentaries, public access, and so on. In other cases, television stations are associated with television networks from which the television station receives content. For example, a single television network may be associated with multiple television stations spread across a large area in order to reach a greater audience. As a result, users tend to associate television stations not just with the channel number used to access the television station's content, but also with the source or type of content that is aired by the television station. Thus, television stations are often branded with a channel name that serves many of the same purposes as a trademark, engraining the television station into the minds of users and in some cases developing user confidence in the content provided by a particular network, even if that content is presented by different television stations. Channel names are often also trademarked by the television stations or television networks to which they belong. Furthermore, television stations that broadcast content over the air are also subject to a federal requirement to identify themselves at periodic intervals. The designation used for this purpose is often referred to as a "call sign". Thus, television stations which have call signs will sometimes use their call sign, or a variation thereof, as their channel name.

When the number of channels available to a multimedia device is relatively small, users tend to be able to remember which channel numbers are associated with the television stations and/or content that they want to view. However, the number of channels available to multimedia devices has increased rapidly over the years, with many multimedia devices presently receiving content over hundreds, if not thousands, of different channels. Consequently, many users find it difficult to remember which channel numbers are associated with the television stations or content that they wish to view. To further exacerbate matters, different television stations transmitting content from the same television network often do not transmit the content using the same channel number. Thus, in one geographic area a particular television network's program lineup may be accessed using one channel number, while in another geographic area the same program lineup may be accessed using a different channel number. As a result, users moving from one geographical area to the other may not be familiar with which channel numbers map to channels playing content from a particular television network. Since users who are not familiar with the channel numbers are unable to tune directly to their desired channel, often times such users will resort to "channel surfing" or tuning from channel to channel searching for their desired content. Channel surfing can be a tedious and time consuming process, especially when the number of channels that the user needs to search through is very large.

To assist users with locating programming to view, many multimedia devices provide an electronic program guide (EPG) that displays menus of scheduling information for broadcast programming. In some cases, EPGs allow users to navigate the scheduling information interactively, selecting and discovering dates and times when programs will be airing over the various channels. In addition, EPGs sometimes offer additional information, such as content ratings, genre, and/or short descriptions of each program. However, as the number of channels available to multimedia devices increases, the number of entries within the EPGs increases accordingly.

DETAILED DESCRIPTION

Figure 1:
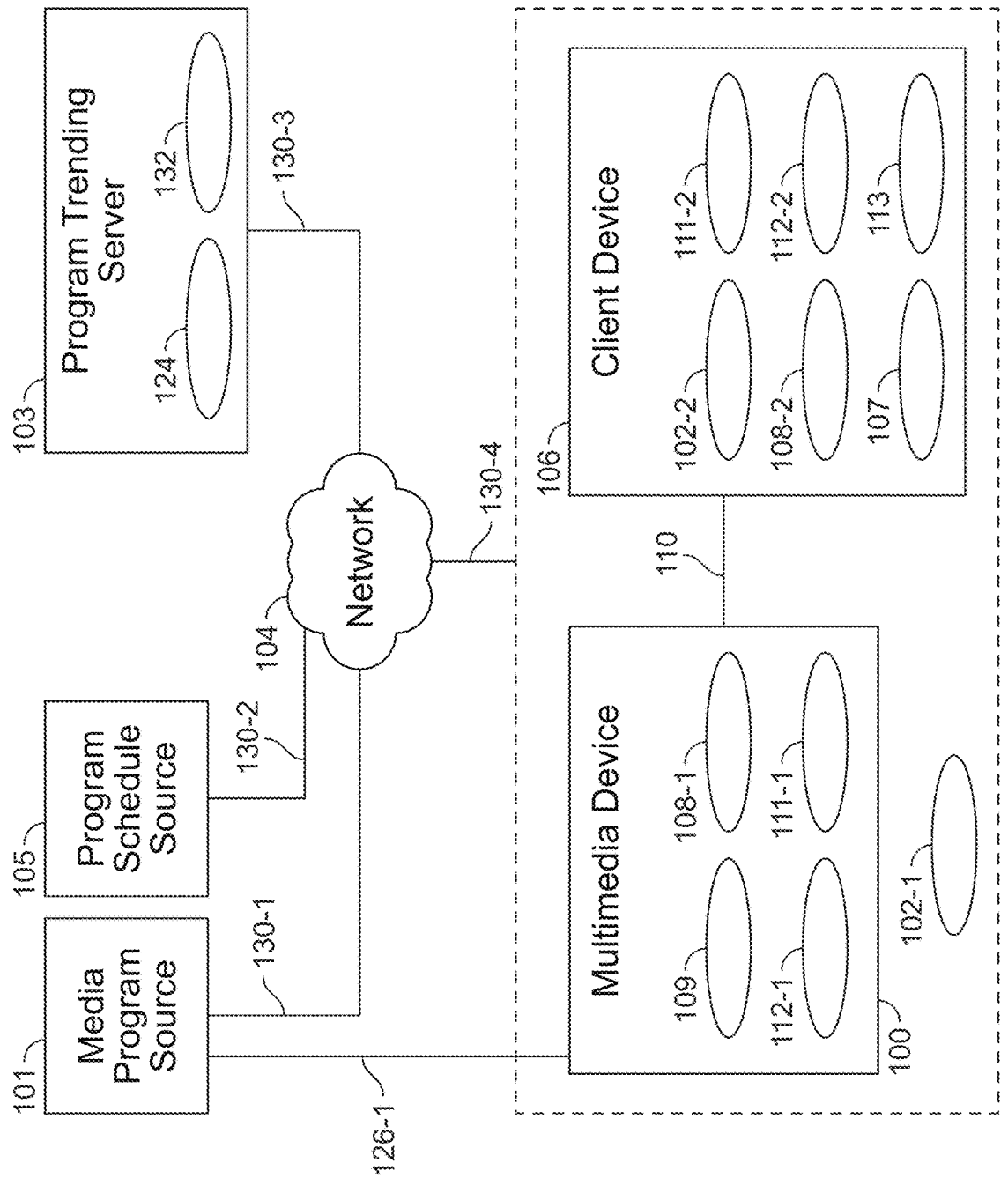
FIG. 1 illustrates an example environment upon which an embodiment of the present invention may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Example features can be found according to the following outline:
1.0 General Overview
2.0 Example Environment
3.0 ARM Data and Editorial Content
4.0 Aggregation of ARM Data and Editorial Content
5.0 Filtering
6.0 Example Interaction with One or More "Mind" Devices
7.0 Generating Media Program Recommendations
8.0 Example Algorithms
9.0 Media Program Recommendations in Different Time Zones
10.0 Example User Interface Pages
11.0 Example Process Flows
12.0 Hardware Overview 1.0 General Overview Users often find it difficult to locate channels for purposes such as tuning and obtaining scheduling information, especially when the number of channels available to a user's multimedia device becomes very large. Thus, techniques for determining media program recommendation for media programs that are of interest to individual users in various contexts are described herein.

These techniques can be used to help users easily discover time contextual and personally relevant content from TV programs, video-on-demand (VOD), broadband content, etc., which can be consumed immediately or at a later time.

Based on audience research and measurement data, these techniques can be used to rank media programs related or unrelated to season pass, online subscription-based media content, private video content from friends and other users, etc. These techniques can be used to help users easily discover and aggregate content among different content sources.

From a client such as a tablet computer, a TiVo Central webpage, etc., a user can start a program trending application with an easy-to-use interface for the user to discover diversified content and to start watching directly or at a later time. These techniques combine multiple data sources (e.g., TiVo, third party, critics, etc.) and recommend, to a user, personally relevant content specific to the user.

In an embodiment, a method, comprises: receiving a plurality of media program recommendations in a plurality of trending categories, each trending category trending media programs having one or more common trending characteristics, and each trending category in the plurality of trending categories comprising one or more media program recommendations in the plurality of media program recommendations; and displaying the plurality of trending categories with the plurality of media program recommendations.

In an embodiment, the method further comprises: receiving a media program recommendation filter setting from a user; sending the media program recommendation filter setting to one or more sources that generate the plurality of media program recommendations; wherein the plurality of media program recommendations is selected based at least in part on the media program recommendation filter setting.

In an embodiment, method, further comprises: displaying a selectable control, wherein the selectable control is configured to be invoked by a user to provide one or more comments related to a media program that is accessed by the user through a media program recommendation in the plurality of media program recommendations.

In an embodiment, method, further comprises: displaying an indicator with a media program recommendation, wherein one or more non-third-party originated information items are displayed for the media program recommendation, and wherein the indicator indicates a third-party originated information item for the media program recommendation.

In an embodiment, the method may be performed by a first device, and wherein the one or more local media sources are locally connected with the first device. In an embodiment, the method is performed by a first device being operated by a user, and wherein the user is able to select to view a media program that corresponds to a media program recommendation on either or both of the first device and one of the one or more local media sources locally connected with the first device.

In an embodiment, one or more media programs corresponding to one or more media program recommendations in at least one trending category in the plurality of trending categories are from a remote service.

In an embodiment, one or more media programs corresponding to one or more media program recommendations in at least one trending category in the plurality of trending categories is from one or more local media sources.

In an embodiment, the plurality of media program recommendations is specifically selected for a specific user, and wherein a plurality of different media program recommendations is selected for a user different from the specific user.

In an embodiment, the media program recommendation filter setting is to filter media program recommendations in a specific trending category trending media programs in a specific trending category.

In an embodiment, the plurality of media program recommendations comprises one or more media program recommendations for media programs accessible through a channel line-up specific to a user.

In an embodiment, the plurality of media program recommendations comprises one or more media program recommendations for media programs accessible through an internet content provider.

In an embodiment, a method, comprises: receiving an electronic program listing; generating, based at least in part on the electronic program listing, a plurality of media program recommendations in a plurality of trending categories, each trending category trending media programs having one or more common trending characteristics, and each trending category in the plurality of trending categories comprising one or more media program recommendations in the plurality of media program recommendations; and displaying the plurality of trending categories with the plurality of media program recommendations.

In an embodiment, the electronic program listing is either from a service or from one or more local media sources.

In an embodiment, the method further comprises: receiving a list of recorded media programs from one or more local media sources; generating, based on the list of recorded media programs, one or more media program recommendations in a trending category in the plurality of trending categories.

In an embodiment, a method comprises: receiving a media program recommendation request; in response to receiving the media program recommendation request; identifying a plurality of media program recommendations in a plurality of trending categories, the plurality of media program recommendations being selected based at least in part on the electronic program listing, each trending category trending media programs belonging to a corresponding trending categories, and each trending category in the plurality of trending categories comprising one or more media program recommendations in the plurality of media program recommendations; and causing the plurality of trending categories with the plurality of media program recommendations to be displayed at a computing device to a user.

In an embodiment, the method is performed at least in part by a remote service to the computing device.

In an embodiment, the method is performed at least in part by one or more local sources locally connected to the computing device.

In an embodiment, a multimedia device receives one or more characters representing at least part of a channel identifier. For example, channel identifiers may include, channel name, channel number, and call sign. In response, the multimedia device identifies one or more channels that have a corresponding channel identifier containing a substring that matches the one or more characters. The multimedia device then displays at least a portion of the one or more channels to the user. For example, the one or more channels may be presented in a scrollable list that displays only a particular number of the one or more channels at a time. In response to determining that a particular channel from the list has been selected, the multimedia device tunes to the selected channel.

In another context, users may want to locate scheduling information for a particular channel in an EPG. However, when the user's multimedia device has access to a large number of channels; the EPG contains a correspondingly large number of entries. Thus, the user may be forced into the time-consuming task of manually scrolling through the EPG to find relevant information. Thus, in an embodiment, a multimedia device provides a mechanism that allows users to specify search criteria that is used to filter the EPG data. As a result, the user is presented with a reduced number of EPG entries to look through in order to find information for the particular channel.

In an embodiment, a multimedia device displays a first page of an EPG. The EPG contains channel information for a plurality of channels and the first page displays the channel information for a subset of the plurality of channels. In response to receiving user input specifying one or more characters, the multimedia device identifies one or more channels within the EPG that are associated with a channel identifier that contains a substring matching the one or more characters. The multimedia device displays a second page of the EPG, the second page displaying channel information for a subset of the one or more channels.

Other possible embodiments include a non-transitory computer readable medium that includes processor-executable instructions that enable a processing unit to implement one or more aspects of the disclosed methods as well as a system or apparatus configured to implement one or more aspects of the disclosed methods.

2.0 Example Environment

FIG. 1 illustrates an example environment upon which an embodiment of the present invention may be implemented. FIG. 1 shows a multimedia device 100, a client device 106, a media program source 101, a display unit 102-1, a program trending server 103, a network 104, and a program schedule source 105. Each of these components are presented to clarify the functionalities described herein and may not be necessary to implement the invention. Furthermore, components not shown in FIG. 1 may also be used to perform the functionalities described herein. In addition, functionalities described as performed by one component may also be performed by a different component. Also, although only one of each element is depicted within the embodiment of FIG. 1, a practical environment may have many more, perhaps even hundreds or thousands, of each of the elements depicted within FIG. 1.

The multimedia device 100 includes any, some or all of: a network input/output 108-1, one or more tuner 109, a display subsystem, EPG data 112-1, and a storage device 111-1, an audio/visual input, an audio/visual output, channel usage statistics, wish lists, media program viewing preferences of one or more users, etc. The storage device 111-1 may be used to store recorded programs and other data (e.g., EPG data 112-1, channel usage statistics, etc.). In an embodiment, multimedia device 100 represents any device capable of processing or presenting multimedia content. For example, multimedia device 100 may represent a set top box, such as a DVR, thin client, etc. In an embodiment, multimedia device 100 is configured to receive content from media program source 101. For example, the audio/visual input of multimedia device 100 may comprise a cable receiver, a radio receiver, or a satellite dish.

In some embodiments, a program trending application may be downloaded, installed as a part of the operating system, installed as an update, etc., onto the multimedia device 100. A program trending application may be provided to any of a wide variety of platforms including mobile phones, tablet computers, desktop computers, e-readers, etc.

The program trending application may run on the multimedia device 100, present displays, obtain user input from a user locally at the multimedia device 100, based on media program recommendations received from a system such as the program trending server 103, etc. In some embodiments, the program trending application running on the multimedia device 100 may cause displays to be presented at a different device (e.g., a client device such as 106, etc.), receive a user's input to the different device from the different device, etc.

The client device 106 includes any, some or all of: a program trending application 107, media program recommendations 113, an integrated display unit 102-2, a network input/output 108-2, EPG data 112-2, a client storage device 111-2, etc. In some embodiments, the client storage device 111-2 does not have the EPG data 112-2. The client storage device 111-2 may be used to store program trending application 107 and other data (e.g., media program recommendations 113, EPG data 112-2, etc.). In an embodiment, client device 106 represents any device capable of running the program trending application 107. The program trending application 107 may be downloaded, installed as a part of the operating system, installed as an update, etc., onto the client device 106. In some embodiments, client device 106 can be configured to run as a client to a program trending application running on a different system (e.g., a multimedia device such as 100, etc.), present displays to a user, obtain user input from a user locally at the client device 106, forward the user input to the different system, generate information based on the user input, transmitting the information to the different system, etc. In some embodiments, client device 106 is configured to process or present multimedia content. For example, client device 106 can process or present a media program selected by a user of the client device using the program trending application 107, etc. Client device 106 may represent a mobile device, such as a tablet computer, e-reader, mobile communication device, thin client, etc. In an embodiment, client device 106 is configured to receive content from multimedia device 100, media program source 101, etc.

Client device 106 and multimedia device 100 may be connected with a network connection 110. The network connection 110 may be, but is not limited to, a local network connection, a wireless connection, a wire-based connection, an ad hoc network connection established through a network discovery process, etc. For example, client device 106 and multimedia device 100 may be a part of a local network at a specific location such as a room, a house, a building, a site, a shop, a park, etc. Access points, routers, etc., may be used to provide the network connection 110. In some embodiments, the multimedia content presented at the client device 106 may be streamed by multimedia device 100 through a network connection to the client device 106. In some embodiments, some or all of EPG data (e.g., 112-2, etc.) and/or media program recommendations (e.g., 113, etc.) may be streamed by multimedia device 100 through a network connection to the client device 106.

One or both of client device 106 and multimedia device 100 may be configured with one or more network connections 130-4 to the network 104. One or both of client device 106 and multimedia device 100 may be configured to receive one or more of EPG data, media program, media program recommendations, program trending data, etc., from other systems such as media program source 101, program schedule source 105, program trending server 103, etc., via network connections 130-4.

Program trending data (e.g., 113, etc.) as described herein may be stored in any form, e.g., database, linked list, flat file, or any type of data structure. EPG data (e.g., 112-1, 112-2, etc.) as described herein may be stored in any form, e.g., database, linked list, flat file, or any type of data structure.

In some embodiments, EPG data comprises programming information not specific to a user (e.g., a user of multimedia device 100, a user of client device 106, etc.). Instead, EPG data may be specific to one or more media program sources (e.g., 101, etc.), and may be general to some or all users in a content distribution network, a network work, an over-the-air broadcast region, etc. EPG data may contain programming information for channels that are not in a specific user's channel lineup. The user's channel lineup refers to channels capable of receiving by the user through multimedia device 100, client device 106, media programs freely available to a user, media programs available to a user through the user's subscription to an online media program source, etc. In an embodiment, EPG data (e.g., 112-1, 112-2, etc.) contains metadata representing channel information. For example, the metadata for each channel may include a channel number, a channel name, a call sign, and a timeline of when programs air on the channel. Furthermore, the EPG data may contain metadata specific to particular media programs, such as program title, content rating, actors, synopsis, producer, director, episode number (for programs that are episodic), reviews, etc.

In some embodiments, media program recommendations comprises media program recommendations specific to a user (e.g., a user of multimedia device 100, a user of client device 106, etc.), a device (e.g., multimedia device 100, client device 106, etc.), a household, an entity, etc. Media program recommendations for a specific user may correspond to only media programs that are available in the specific user's channel lineup. In some embodiments, media program recommendations are divided into a plurality of trending categories. Each trending category comprises media program recommendations selected specifically for the user. The media program recommendations may contain metadata specific to particular media programs corresponding to the media program recommendations, such as program title, content rating, actors, synopsis, producer, director, episode number (for programs that are episodic), reviews, etc. Example trending categories include but are not limited to any of: "Favorite Channels," "Recommended Shows," "My Shows," "Shared YouTube Videos," "Sports on Live TV," "New On Demand Movies," etc.

In an embodiment, media program source 101 represents any source and any number of sources from which one or both of multimedia device 100 and client device 106 may derive content. In a non-limiting example, media program source 101 may represent a local broadcaster that streams media content to one or both of multimedia device 100 and client device 106 over one or more channels or over the Internet. In another non-limiting example, media program source 101 may represent a media subscription service that streams media content to one or both of multimedia device 100 and client device 106 over one or more channels or over the Internet. In one embodiment, media program source 101 transmits content over one or more analog frequencies. However, in another embodiment, media program source 101 transmits content in the form of a digital stream, using encodings such as MPEG-2, MPEG-4, etc.

In an embodiment, tuner 109 is any hardware or software component that allows multimedia device 100 to select content streamed by media program source 101 over a particular channel. In one embodiment, tuner 109 changes to a particular channel by tuning to an analog frequency associated with the particular channel. In another embodiment, tuner 109 changes to a particular channel by demultiplexing a digital stream provided by media program source 101. For example, the digital stream may be multiplexed using techniques such as statistical multiplexing, code division multiplexing, time division multiplex, or any other multiplexing techniques. Thus, depending on the embodiment, tuner 109 may rely upon tags, codes, time markers, or other features of the digital stream to select content associated with a particular channel. In an embodiment, after tuner 109 selects content from a particular channel, the tuner 109 provides the content to display subsystem. There may be more than one tuner used by a device such as multimedia device 100, etc.

In an embodiment, a display subsystem (e.g., in multimedia device 100, client device 106, etc.) as described herein may comprise any combination of one or more hardware or software components that processes and transfers content to a display unit (e.g., 102-1, 102-2, etc.). In some embodiments, the display subsystem is capable of modifying the content provided by another unit (e.g., a tuner such as 109, etc.) before transferring the content to a display unit (e.g., 102-1, 102-2, etc.). For example, the display subsystem may insert notifications, logos, advertisements, menu overlays, and other graphical elements into the content provided by another unit. In other embodiments, the graphical elements may be displayed instead of the content provided by another unit. For example, during a pause for a commercial break or to display a menu that covers the entire display of a display unit (e.g., 102-1, 102-2, etc.), as opposed to being overlaid over the content. In still other embodiments, the content from another unit may be minimized to cover only part of the displayable area of a display unit (e.g., 102-1, 102-2, etc.) with graphical elements inserted into the resulting free space. In an embodiment, the graphical elements used by the display subsystem are stored on a storage device (e.g., 111-1, 111-2, etc.). However, in other embodiments, a display subsystem generates the graphical elements and/or displays from data (e.g., media program recommendations, EPG data, wish lists, media program viewing preferences of one or more users, user permissions related to providing private information to a server such as the program trending server 103, stored graphic components, recorded media programs, etc.) stored on a storage device (e.g., 111-1, 111-2, etc.).

In an embodiment, audio/visual output (e.g., in multimedia device 100, client device 106, etc.) as described herein comprises any component that allows transfer of audio/visual data to display unit 102-1. For example, audio/visual output may represent an RCA connector, DVI, FireWire, Fiber-Optic, HDMI, DisplayPort, etc.

In an embodiment, a storage device (e.g., 111-1, 111-2, etc.) is any device capable of storing data. For example, the storage device may represent a hard drive disk, solid state drive (SSD), random access memory (RAM), a flash drive, other storage devices, and combinations thereof.

In an embodiment, a display unit (e.g., 102-1, 102-2, etc.) is any device capable of displaying multimedia content. For example, the display unit may be a television set, monitor, etc.

In an embodiment, network 104 represents any combination of one or more local networks, wide area networks, internetworks, service provider networks, etc. Data exchanged over network 104, may be transferred using any number of network layer protocols, such as Internet Protocol (TCP/IP), Multiprotocol Label Switching (MPLS), Asynchronous Transfer Mode (ATM), Frame Relay, etc. Furthermore, in embodiments where network 104 represents a combination of multiple networks, different network layer protocols may be used at each of the underlying networks. In some embodiments, network 104 represents the Internet.

In an embodiment, one or both of multimedia device 100 and client device 106 connect to network 104 through network input/output (e.g., 108-1, 108-2, etc.). For example, the network input/output (e.g., 108-1, 108-2, etc.) may include one or more of a direct Ethernet connection, a Universal Serial Bus (USB) port for a wired or wireless Ethernet adapter, a connection to a networking device, router, switch, access box, etc., that connects to the network 104, a local connection (e.g., 110, etc.), etc.

In an embodiment, program schedule source 105 represents any server capable of providing EPG information to one or both of multimedia device 100 and client device 106. In an embodiment, program schedule source 105 periodically sends updates to one or both of multimedia device 100 and client device 106 for incorporation into EPG data 112-1 and/or 112-2. For example, program schedule source 105 may, at end of each week, send one or both of multimedia device 100 and client device 106 scheduling information related to the programs that will be aired during the next week or, optionally, send one or both of multimedia device 100 and client device 106 a notification that an EPG update is available. In an embodiment, incorporation includes updating EPG data 112-1 and/or 112-2 with new information or replacing EPG data 112-1 and/or 112-2 with new data received from program schedule source 105. In other embodiments, rather than program schedule source 105 initiating periodic updates, one or both of multimedia device 100 and client device 106 periodically requests updates from the Program schedule source 105.

In some embodiments, one or both of multimedia device 100 and client device 106, when receiving an update or independently of the reception of an update from program schedule source 105, retrieve advertisements or instructions to play advertisements in association with particular channels or programs. These advertisements, in some embodiments, may be placed by display subsystem into menus associated with those channels or programs. In other embodiments, the advertisements may be added to the content provided from another unit when multimedia device 100 presents the associated channel or program.

In an embodiment, program trending server 103 is configured to collect program trending data and generate, based on the collected program trending data, media program recommendations in a plurality of trending categories for any given user in a plurality of users. The program trending data comprise past usage statistics, real-time or near-real time trending indications, future trending predictions, real time and/or non-real-time media program ranking information, etc. The program trending data may be collected for one or more user populations from one or more program trending data sources (e.g., a third party system that provides ranking information about live games; a media program critic's feed that provides comments about various media programs that have been shown, are being shown, and/or will be shown; a trusted source that provides ranking information for sitcoms, movies, shows, etc., multimedia devices that record their users' wish lists, media program viewing preferences, and operations, a social network that tracks its users' interest in media programs, a system that users share their media programs, etc.). A user population as described herein may include but is not limited to any of: cable subscribers, satellite subscribers, over-the-air broadcast viewers, internet based media subscribers, social network users, etc. The program trending data may comprise a plurality of individual program trending data portions, each of which is specific to a given user in a plurality of users. An individual program trending data portion for a first user is different from another individual program trending data portion for a second user. Thus, program trending server 103 can be configured to determine user-specific, different media program recommendations for different users based at least in part on respective program trending data portions for the users.

The past usage statistics may comprise past information (e.g., one or more hours old, one or more days old, one or more weeks old, etc.) about a specific user's channel usage, a specific user's recorded programs, channel usage by a group of users, channel usage by users during a particular time interval of day, week, weekday, weekend, a prime time interval of a given day, a non-prime time interval of a given day, during a first viewing of a particular program, a repeat viewing of a particular time, etc., channel usage by users in a specific region, country, etc., internet based viewing statistics of one or more media programs, internet based downloading statistics of one or more media programs, channel usage by other users including but not limited to a user's friends, media programs that other users including but not limited to a user's friends have watched, media programs that other users including but not limited to a user's friends have downloaded, media programs other users including a user's friends have made available, etc.

The real-time or near-real time trending indications may comprise information about media programs that are of various degrees of popularity in real-time or in near-real-time (e.g., within a small window such as a few seconds, a few minutes, a few hours, etc.). For example, the trending indications may indicate that a live broadcast about a terrorist bombing at a major marathon event may be attracting a large number of viewers in real time or in near-real time. The trending indications may be derived from a representative audience's current viewing activities, a representative audience's scheduled recordings for the present time, a search engine's real-time search activities, a social network's real-time messages, etc. The trending indications may be determined based on past information. The program trending server 103 may be granted permissions by some users of multimedia devices to receive privacy protected information including but not limited to a viewer's viewing preferences, wish lists, viewing activities, recorded media programs, searching activities, messaging activities, season passes, scheduled recordings, etc. The program trending server 103 may be granted permissions by some users of other systems (e.g., search engines, social networks, media subscription services, etc.) to receive privacy protected information including but not limited to a viewer's viewing preferences, wish lists, viewing activities, searching activities, messaging activities, etc.

The trending predictions may comprise information about media programs that are of various degrees of popularity in the future (e.g., one or more hours from now, one or more days from now, next Tuesday, the coming weekend, one or more weeks, etc.). For example, the trending predictions may indicate that a media program first showing in a particular region will be attracting a large number of viewers because the media program has been very popular in a different comparable region. The trending predictions may be derived from a representative audience's past, current, and planned viewing activities, a representative audience's scheduled recordings for the past, present, and future time, a search engine's past and present search activities, a social network's past and present messages, etc.

Program trending server 103 may collect program trending data related to various geographical areas or demographics. Program trending server 103 may collect the program trending data from one or more program trending data sources including but not limited to multimedia devices, client devices, third party systems, media subscription servers, etc. In an embodiment, when a user selects a channel for viewing or recording, multimedia device 100 indicates the selection within channel usage statistics. Examples of information that may be stored within channel usage statistics include channel number, channel name, call sign, the program playing at the time of selection, user profile data, the length of time the channel or program was viewed or scheduled for recording, timestamp, etc. In some embodiments, the information contained within channel usage statistics may be anonymized before or after being transferred to program trending server 103 in order to protect user privacy. Program trending server 103 may perform polling with one or more of the data sources. Additionally, alternatively and/or optionally, a data source may report out collected data to program trending server 103.

In an embodiment, program trending server 103 is configured to receive filter settings from users, and to apply a user's specific filter settings when generating media program recommendations for the user.

3.0 Arm Data and Editorial Content

In some embodiments, program trending data as described herein may include but is not limited to: audience research and measurement (ARM) data, editorial content, etc. In some embodiments, program trend server 103 receives and stores 1) the ARM data that includes "day parts" (e.g., time slots, time periods, time buckets, half hour buckets, etc.) information to provide popularity scores of media programs in a time interval distribution covering some or all of a given day, and 2) editorial content that augments the ARM data and allows injection of (e.g., rare, breaking story, one-off, etc.) content like a Presidential debate that may not be represented in the ARM data.

The ARM data may be collected from user interaction with a plurality of multimedia devices (e.g., DVRs, set-top boxes, etc.) and/or a plurality of client devices (e.g., tablet computers, mobile devices, etc.).

In a non-limiting example embodiment, ARM data may be provided to program trending server 103 (e.g., as a text file, an XML file, etc.) that can be transformed into several data sets in an ARM database. These data sets are used by program trending server 103 to find media program recommendations and provide responses with individualized sets of media program recommendations to individual queries from users of multimedia devices and/or client devices. One of the data sets may be used to store popularByDayPart data to indicate a popularity score of a media program at a day part (or a particular time duration such as half an hour beginning at 7 am in the morning, an hour at prime time, 90 minutes in the afternoon, other time intervals of a day, etc.) of a day of week at which the media program is shown. In some embodiments, additional information such as a trending category (e.g., a slice, a media program type, etc.) among a plurality of trending categories (e.g., slices, etc.) may be stored in the same data set or in a different data set in the ARM database accessible by program trending server 103. An example trending category or slice may be "kids." Other trending categories or slices may be movies, sports, etc. As used herein, a trending category or slice may refer to a user-perceivable aspect, characteristic, genre, type, etc., of media programs regardless of which channels or which sources from which the media programs can be made available to a given user.

The editorial content can be provided by a system module or unit (which, for example, may be a part of the program trend server 103; operate in conjunction with the program trend server 103; etc.) that is configured to accept editorial content input from one or more editors, critics, third parties, trusted sources, etc. The editorial content may be used to augment popularity scores generated based on user interaction, and help promote content that may not be represented in the popularity scores. The editorial content may comprise information that identifies a promoted media program, a media program that is anticipated to be popular, a (e.g., trusted) source that provides the editorial content related to a media program that is promoted or anticipated to be popular, etc.

Media programs in the ARM data and/or editorial content may be organized in, or indicated with, trending categories/characteristics, slices, mixes, groups, genres, etc. Editorial content and/or ARM data as described herein may be stored in one or more data sets of an ARM database or a separate database. In some embodiments, at least a part of editorial content and/or ARM data may be stored externally in relation to program trending server 103. For example, program trending server 103 may receive editorial content and/or ARM data on demand, via polling from time to time, with asynchronous updates, etc.

4.0 Aggregation of Arm Data and Editorial Content

Figure 2:
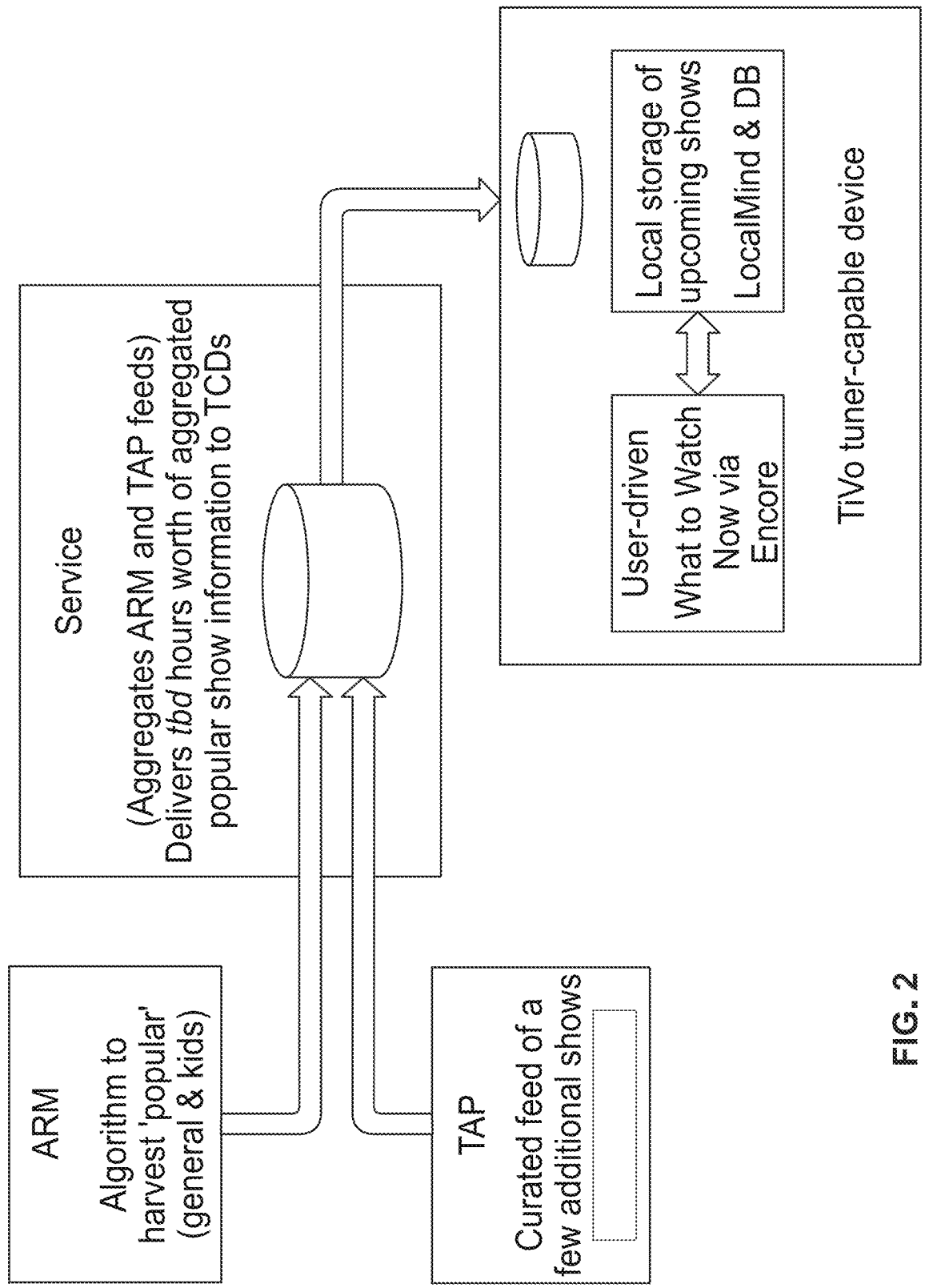
FIG. 2 depicts aggregation of ARM data and editorial content into media program recommendations to a client.

FIG. 2 depicts aggregation of ARM data and editorial content into media program recommendations to a client (e.g., a consumer device such as TiVo consumer device (TCD), a tuner-capable device such as a multimedia device 100, etc.). One or more algorithms (denoted as "ARM") may be used to harvest or discover "popular" media programs (e.g., general, sports, popular TVs, kids, etc.). The popularity information of media programs represents ARM data that may be stored in a media service (e.g., a program trending server 103, a system including a program trending server 103, a part of a program trending server 103, etc.). Curated feed of a few additional shows (denoted as "TAP") represents a part of editorial content that may also be stored in the service. Media program recommendations (e.g., aggregated popular show information, etc.) available in a particular time period (e.g., hours, etc.) as determined based on the ARM data and/or the editorial content may be delivered to the client. The client (e.g., a TiVo tuner-capable device, etc.) may be configured to store the received media program recommendations in local storage (e.g., that of upcoming shows, a local database denoted as "Local Mind & DB", etc.). The media program recommendations can be used in user-driven application (denoted as "What to Watch Now via Encore," etc.) such as a program trending application, etc.

In some embodiments, at least a part of editorial content may be provided by an authoring team for the purpose of enhancing the ARM data (which may include but is not limited only to: data sets or data feeds for trending categories such as "Popular on Now," "Kids on Now," etc.). Additional media program recommendations may be determined based on the ARM data and/or the editorial content to support additional trending categories on a client if the number of the additional media program recommendations is large enough (e.g., 20, etc.) to support a new trending category for the user in the user's channel lineup. The program trending application on the client may be implemented in a data-driven processing model such that a new trending category of media program recommendations can be relatively easily supported at the client (e.g., display the new trending category to the user, user interaction related to the new trending category, etc.).

A program trending server 103 may be configured to be updated from time to time by media program popularity information harvested for different trending categories from the ARM data. In an example, media program popularity information for "Popular on Now" or "Popular TV" may be given to a program trending server 103 in 30 minute increments. In an example, media program popularity information for "Kids on Now" or "Kids" may be given to a program trending server 103 in 15 minute increments. Popularity information for a specific media program may, but is not limited to, be harvested based on the ARM data indicating the most watched shows from the previous week, etc.

A program trend application is configured to allow a user to override the default ordering of media program recommendations and/or trending categories. In some embodiments, at least some media program recommendations may be ordered (e.g., by a default or user-specified order of trending categories, popularity scores, a third party ranking, etc.) by program trending server 103 in a response to a query from a client. Alternatively, at least some media program recommendations may be ordered by a client that receives a response from program trending server 103 to a query from the client. The ordered media program recommendations may be used to drive user interactions relatively efficiently and responsively.

In some embodiments, additional information such as information identifying a user interface (UI) destination element "Popular TV," etc., may be provided in a response with an information element (e.g., one or more media program recommendations, a third party ranking, etc.) that is to be used for the UI destination element.

In some embodiments, emergency information, etc., may be provided in a response to cause or initiate a UI display that renders or conveys at least a part of the emergency flash information, etc., to a user. In some embodiments, emergency information, etc., may be provided to a client who in response may be configured to remove one or more inappropriate media program recommendations (e.g., negatively ranked, negatively thumbed, etc.) from a user display and/or from a local database at the client.

A local database at a client may be used to provide media program recommendations (e.g., recorded programs, etc.) based in data (e.g., MyShows, My Favorite Channels, etc.) local to the client. In some embodiments, media program recommendations cached and stored in a local data stored to a client may be used to support a program trending application even when the application is not connected with program trending server 103.

In some embodiments, media program recommendations and related information may be pre-fetched and cached on a client, program trending server 103, an intermediate device, etc., to support aggressive performance goals.

In some embodiments, in response to receiving a query from a client (e.g., a multimedia device 100 or a client device 106, program trending server 103 creates a union of information selected from one or more data sets, generate, based on results of the union, a single set (e.g., list, etc.) of media program recommendations, and returns the single set of media program recommendations to the client as a response to the query.

A response provided by program trending server 103 may comprise media program recommendations to be displayed at a multimedia device (e.g., 100, etc.) or a client device (e.g., 106, etc.) as what-to-watch (WTW) popular shows. The response may comprise media program recommendations in a PopularOnLiveTV category (e.g., slice, bucket, etc.) for a given time. A query may specify that media program recommendations are to be retrieved for a particular time (e.g., now, two hours from now, at a later time of the same day, at a later time of a different day, at a later time of a different week, etc.). A response to the query returns media program recommendations that are selected for media programs that are available for viewing or recording by the user at the specified particular time in the user's specific channel lineup (e.g., media subscriptions, cable channels, satellite channels, over-the-air broadcasts, recorded programs on the user's multimedia device, etc.).

Popular shows in the media program recommendations may be based on the most popular Season Passes (SP) and the most popular Explicit Recordings (ER) in a given time of a given day of a given week based on the ARM data. The popular shows can be heavily skewed toward prime-time shows.

A program trending application running on a multimedia device 100 or a client device 106 may display media program recommendations for media programs that are "On Now" (e.g., in the user's channel lineup, etc.). A program trending application running on a multimedia device 100 or a client device 106 may display media program recommendations for media programs that can be watched at a specific later time (e.g., two hours from now as the user may be commuting at the present time, etc.).

In some embodiments, a sufficient number of media program recommendations are generated for different time durations including but not limited to: non-prime time, prime time, etc. Different selection criteria and filtering techniques can be used to select popular shows for different time durations. For example, the selection criteria for non-prime time may permit inclusion of a media program with a relatively low popularity score since there may be very few shows available for the user. In contrast, the selection criteria for prime time may cause exclusion of a media program with a relatively high popularity score since there may be many shows available for the user.

A plurality of dayPart values may be defined to track popular media programs in a plurality of time durations respectively corresponding to the plurality of dayPart values. Example dayPart values include but are not limited to: named values such as Early Morning 1, Early Morning 2, Morning Daytime 1, etc. Program trending server 103 may store information identifying a plurality of (e.g., 5, 10, 20, 50, 200, etc.) popular media programs available in a given time duration.

The plurality of dayPart values may also be grouped or reduced to a plurality of broadName values by the ARM database. Each broadName value may correspond to one or more dayPart values.

Separate data sets in the ARM database can be used to store or include popularity related information for media programs representing season passes (SP) and media programs representing non-season passes (e.g., explicit recordings (ER), etc.).

A program trending application running on a client (e.g., a multimedia device 100, a client device 106, etc.) may receive, directly or indirectly from a program trending server 103, media program recommendations for season passes organized or specified with their respective dayPart values or different time durations. A program trending application running on a client (e.g., a multimedia device 100, a client device 106, etc.) may receive, directly or indirectly from a program trending server 103, media program recommendations for non-season passes (e.g., a single explicit recording, a single explicit program, etc.) organized or specified with their respective dayPart values or different time durations. In some embodiments, the program trending application can be configured to receive, directly or indirectly from a program trending server 103, media program recommendations from "On Now" to a plurality of time durations throughout a day, a week, several weeks, etc.

The media program recommendations received by the program trending application may be organized or specified with subsets (containing one or more) of broadName values, broadName values only, dayPart values only, a combination of broadName values and dayPart values. The media program recommendations received by the program trending application may be organized or specified with values indicating different trending categories. In some embodiments, a subset of BroadName values may comprise a subset of time durations for Morning, Daytime, Fringe, Prime, Late, etc.

In selecting media program recommendations, possibly different weight values may be assigned to different media programs, for example, to favor prime-time shows, to favor season shows signed up with the most numbers of season passes, etc. Different weight values may also be determined for the same media program based in part on the total number of shows available in each DayPart value which the media program falls into.

A limited number of (e.g., 1, 2, 3, etc.) queries issued by a client may cause media program recommendations to be received, directly or indirectly—e.g., a client device 106 obtains media program recommendations from a multimedia device 100 that receives the media program recommendations from a program trending server 103, etc.—media program recommendations for a time period such as the next 24 hours, the next 10 hours, the next hour and half, etc.

A user may have a specific channel lineup (including but not limited to online media service descriptions, etc.). In some embodiments, program trending server 103 is configured to filter media program recommendations based on the user's specific channel lineup. Thus, any of the media program recommendations shown to the user by the program trending application can be selected (e.g., through tapping, etc.) by the user for viewing or recording.

A use may be located in a specific time zone. In some embodiments, program trending server 103 is configured to convert times related to media program showings that are not appropriate for the specific time zone to times in the specific time zone, to select media program recommendations based on times in the user's specific time zone at which corresponding media programs are being shown or are to be shown, to return the media program recommendations to a client with the user's specific time zone.

5.0 Filtering

In some embodiments, a device (e.g., program trending server, multimedia device, an intermediate device, a media service, etc.) selects media program recommendations by querying program trending data (e.g., the ARM database, etc.) with one or more filters (e.g., a feedContentFilter, etc.). Each of the filters may be used to define a type of media program recommendation feed that maps to a title of the feed presented/displayed to a user by the program trending application running on a client. Example filters include but are not limited to any of: "newOnDemand," "suggestions", etc. A filter may comprise a plurality of data fields including but not limited to any of: availableWithinDays—If specified, results will be filtered to have only media program recommendations available within a specified number of days. If unspecified, no restriction will be placed on time; frame of availability—If set to 0, only results available now will be returned; bodyId—If specified, only results that are available to a client (e.g., the client who sends a query, etc.) can be included; orCategoryId—This allows the client to request feeds with specific categories such as "popular TV," "favorite channels," "sports", "my shows," "kids", etc.; accountId—If specified, this will filter out results that are not available to the account; partnerId—Used in conjunction with accountId to apply account entitlements specific to a given partner (e.g., Amazon, NetFlix, Hulu, etc.); deviceType—Optional filter that will only return feeds for the particular device type; supportedTransport—Optional filter that will only return feeds with the specified transports; hdtv—Optional filter that will only return results that are in the high definition TV (HDTV) quality; cc—Optional filter that will only return results that have closed captioning; titleLetterRangeStart—Optional character to filter titles by, and can be used in conjunction with titleLetterRangeEnd; titleLetterRangeEnd—Optional character to filter titles by, can be used in conjunction with titleLetterRangeStart; orPackageId—Optional packageIds to filter results by; orCategoryId—Optional categories to filter results by; maxStartDateTime—Optional maximum start date and time to filter results by; minEndDateTime —Optional minimum end date and time to filter results by; orTvRating—Optional TV Rating(s) to filter results by; orderBy—Support sorting by mostPopular, newest, title, etc.; etc. In some embodiments, media programs negatively thumbed, negatively ranked, etc., may be filtered out from media program recommendations for a specific user. In some embodiments, the user (e.g., an adult, a media researcher, etc.) may be permitted to override this filtering.

In some embodiments, a device (e.g., program trending server 103, multimedia device 100, etc.) other than a specific client (e.g., a client device 106, etc.) performs filtering of media program recommendations based on a specific user's channel lineup. In some embodiments, a specific client (e.g., a client device 106, etc.) performs filtering of media program recommendations based on a specific user's channel lineup, for example, locally.

In some embodiments, some or all filter settings may be settable by a user of a client. For example, a program trending application as described herein may present the current and/or default filter settings to a user in one or more displays and allow the user to make changes, additions, deletions, etc., to the filter settings. In some embodiments, filter settings may be made implicitly for a user based on the user's activities (e.g., like Sitcom, action movies, etc., but not sports and documentaries, like certain channels but not others, recorded certain shows, etc.). A user's viewing preferences, wish lists, operations, viewing history, and other privacy related information may be shared and/or monitored by a client with other devices after the user indicates permissions to do so.

6.0 Example Interaction with One or More "Mind" Devices

Figure 3:
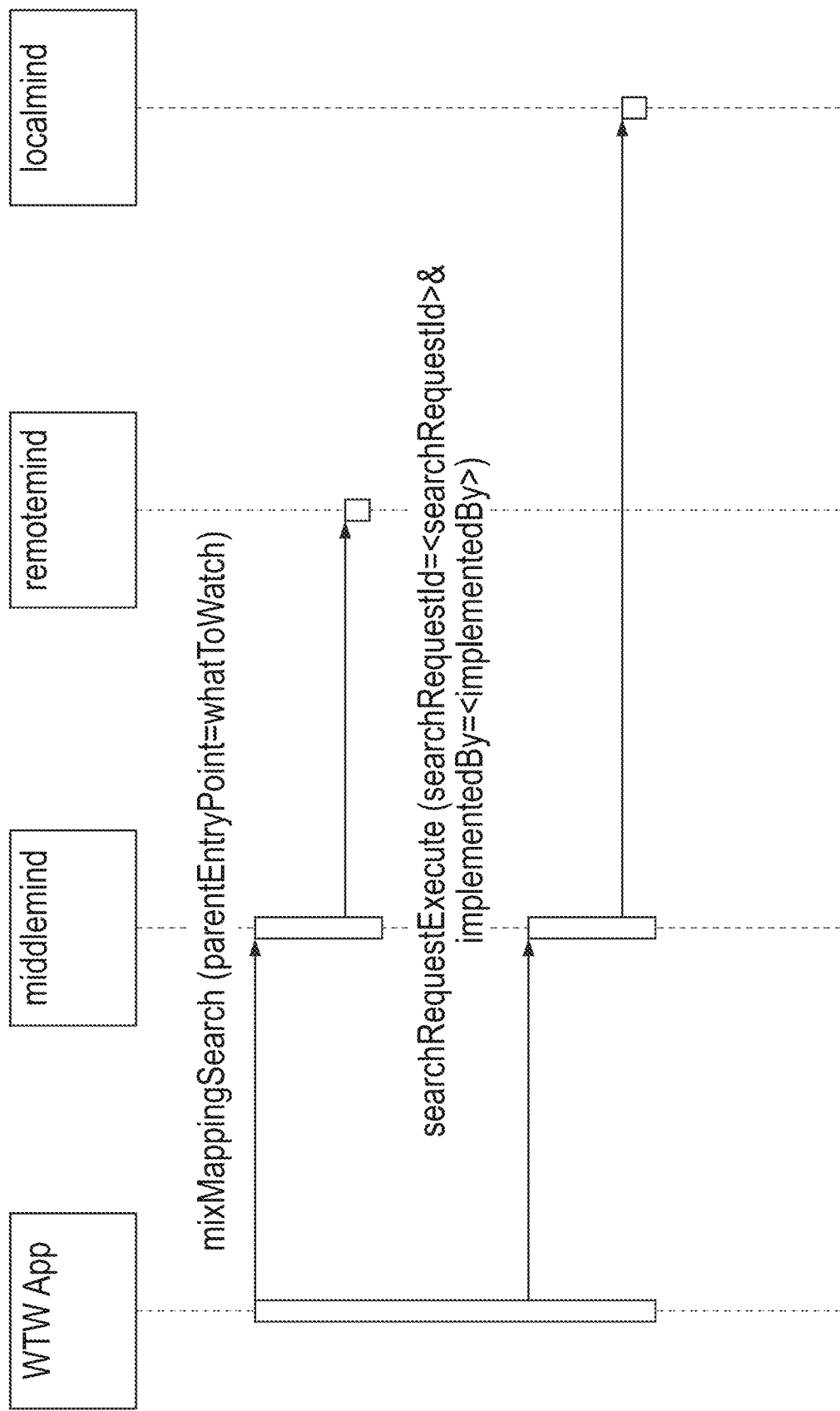
FIG. 3 depicts example interaction between a program trending application and one or more devices.

FIG. 3 depicts example interaction between a program trending application and one or more devices when a request or query is made (e.g., triggered by a program trending application at a client, when a user of a client tapping an application icon in a display screen to start a program trending application, by a multimedia device 100, by a client device 106, etc.) for media program recommendations generated based on program trending data. A client may choose to cache results of such a query and only invoke the query periodically, from time to time, when a program trending application is active, etc. In some embodiments, the query may take local caching into account to determine what filter settings or what query parameters should be specified for a complete listing of media program recommendations in a plurality of trending categories or for incremental changes of media program recommendations in the plurality of trending categories. Other devices (e.g., program trending server 103, multimedia device 100, etc.) other than the client (e.g., client device 106, etc.) can be configured to return enough data to satisfy the client until the next invocation of the query.

In a non-limiting example implementation, a program trending application (denoted as "WTW App") on a client (which may be client device 106, etc.) invokes a mixMappingSearch call with parentEntryPoint set to whatToWatch and omitDisabledChildMixes set to true. The "whatToWatch" setting indicates to a recipient device that the client is interested in obtaining media program recommendations generated with program trending data. In some embodiments, the recipient device of this mixMappingSearch call is an intermediate device (denoted as "middleMind"; which may be multimedia device 100, a middle device other than multimedia device 100, etc.) between the client and program trending server 103 (denoted as "remoteMind"). In some embodiments, program trending server 103 may act as a "Mind" device (e.g., a "localMind" device, a "middleMind" device, a "remoteMind" device, etc.) that generates some or all media program recommendations based on EPG data and program trending data to be presented to a user of multimedia device 100 and/or to a user of client device 106. In some embodiments, multimedia device 100 may act as a "Mind" device (e.g., a "localMind" device, a "middleMind" device, etc.) that generates some or all media program recommendations based on EPG data and program trending data to be presented to a user of multimedia device 100 and/or to a user of client device 106. In some embodiments, client device 106 may act as a "Mind" device (e.g., a "localMind" device, etc.) that generates some or all media program recommendations based on EPG data and program trending data to be presented to a user of multimedia device 100 and/or to a user of client device 106.

Other parameters, filter settings, etc., may be specified with the call to indicate a plurality of trending categories (e.g., default if not explicitly specified, etc.) in which the client requests media program recommendations, filtering for media programs that are available to the client. One or more searchRequest objects may be used to return selected media program recommendations for each requested trending category (e.g., feed, etc.) in the plurality of trending categories (e.g., "My Shows," "Sports", etc.). A parameter may be used to indicate whether a complete set of media program recommendations filtered for a specific user is to be returned or whether an incremental update comprising removals, additions, changes, etc., of media program recommendations is to be returned.

The "middleMind" device is configured to forward the request a query in a call to a "remoteMind" device if necessary. When these calls return from the recipient devices to the calling devices, media program recommendations in the plurality of trending categories are returned (e.g., from the "remoteMind" device to the "middleMind" device and then from the "middleMind" device to the program trending application (or "WTW app").

In some embodiments, for each media program recommendation, the program trending application on a client determines a method of accessing a feed of a media program corresponding to that media program recommendation. For example, a media program recommendation may come with an "implementedBy" indicator. If the "implementedBy" indicator is either null or has a "remote" value, then the program trending application invokes a searchRequestExecute call to the "localMind" device (e.g., client device 106, multimedia device 100, etc.). The "localMind" device forwards to the middleMind device (e.g., multimedia device 100, another device other than multimedia device 100, etc.), which further forwards the call to the "remoteMind" device (e.g., program trending server 103, etc.). When the call successively returns to the program trending application, a method of invoking a feed of the media program is provided to the program trending application. Thus, when a user of the program trending application selects the media program recommendation for the media program, the media program can be caused to be recorded or viewed by the user at either or both of the client (e.g., client device 106, etc.) or another device (e.g., multimedia device 100, etc.).

If the "implementedBy" indicator for a media program recommendation has a "local" value, then the program trending application invokes searchRequestExecute along the "implementedBy=local" to a localMind device. The "localMind" device sends the same call with an indication that "implementedBy" in the original request is set to "local" by the originating application to the "middleMind" device and/or further to the "remoteMind" device. Additional information may be obtained from the "middleMind" device and/or the "remoteMind" device in connection with the media program. However, the feed of the media program may be implemented locally when the user selects the media program for viewing or recording.

If the "implementedBy" indicator for a media program recommendation has an "external" value, then the program trending application looks at specific information that comes with the media program recommendation determine what code, procedure, call, etc., to invoke within the program trending application in order to access the feed of the media program (e.g., from an external source, Hulu, NetFlix, etc.). If no code, procedure, call, etc., is found, the media program recommendation can be omitted from being presented to the user.

In some embodiments, a media program recommendation may be selected to cause a playback of a media program a feed of which is from a third party media source such as Netflix, Hulu, etc. Additionally and optionally, a media program recommendation may be selected to cause an offer to be presented to a user to purchase a (e.g., broadband) media program; once the user purchased the media program, a feed of the media program is made available to the user from a (e.g., local, remote, internet-based, etc.) media source.

In some embodiments, a program trending application as described herein may present only HD content if the same media program is available in HD content and in other lower-quality (e.g., SD) content. In some embodiments, media programs that have thumbs-down ratings are still shown. In some other embodiments, media programs that have thumbs-down ratings are not shown. When a user selects a media program in progress, if the media program has a certain minimum length (e.g., 15 minutes for live shows, 10 minutes for news, always shown for sports, etc.) of time left, the media program may be shown.

A call such as searchRequestExecute may be augmented by the caller (e.g., the program trending application, etc.) to include filter settings (e.g., in a unifiedItemFilters data structure, etc.). In some embodiments, the caller can specify the maxStartTime, minEndTime, and transportType(s) that are relevant for the device and time with which the call is made.

In some embodiments, more than one request may be sent to a recipient device. If a previous request is in cache, a later request may relay the cached request to the recipient device (e.g., the "remoteMind" device, etc.) so that the latter device can determine what updates relative to the results provided in response to the previous request should be provided with the current request. In some embodiments, at least a part of a response received from a requested device (e.g., the "remoteMind" device, etc.) can be cached at the client (e.g., client device 106, etc.), or at a different device (e.g., multimedia device 100, etc.) other than the client. In some embodiments, the "localMind" device caches results from the "remoteMind" device at discrete intervals up to a time period of 24 hours, etc. A searchRequestExecute call or operation may be made with time window parameters (e.g., unifiedItemFilters.maxEndTime, unifiedItemFilters.minStartTime, etc.) to define a cache window. The "remoteMind" device can be configured to return a set of results that can be used within this time window.

In some embodiments, one or more devices (e.g., program trending server 103, multimedia device 100, client device 106, etc.) may be configured to receive external reviews and information about media programs from local and/or remote sources. Such a device may query a local database, another device, a third party, etc., to obtain the external reviews and information from the third party. When (e.g., after, in response to, etc.) receiving an indication of selection of a media program recommendation by a user, external reviews and information obtained from third party may be made accessible by the user. Examples of external reviews and information about media programs may include but are not limited only to any of: "Rotten Tomatoes" movie reviews, IMDB movie and TV show links, IMDB cast member links, excitement ratings and sports discovery information from a sports discovery service such as Thuuz, social networking sites, trusted sources, critics feeds, editorial feeds, media program measurement feeds, etc. A program trending application as described herein may be configured to allow a user to select, add or remove specific third parties, trusted sources, etc., to obtain external reviews and information. The program trending application may be configured to combine the external reviews and information with a media program recommendation in one or more displays presented to the user.

In some embodiments, instead of using one or more program trending servers (e.g., 103, etc.) to generate media program recommendations in a plurality of trending categories, some or all of media program recommendations can be generated locally at a client (e.g., multimedia device 100, client device 106, etc.). The client can generate—based on user's viewing preference, user interactions, a user's channel usage, a user's recorded media program history, a user's currently available recorded media programs, a user's scheduled recordings of future media programs, etc.—media program recommendations using EPG data, ARM data, editorial content, etc., available to the client and the user's channel lineup. For example, client device 106, which may be a tablet computer, can be configured to receive EPG data, ARM data, editorial content, etc., and generate media program recommendations to be presented to the user at client device 106.

In some embodiments, some or all of media program recommendations can be generated at an intermediate device other than a client (e.g., multimedia device 100, client device 106, etc.) or a program trending server 103. The intermediate device can generate—based on user's viewing preference, user interactions, a user's channel usage, a user's recorded media program history, a user's currently available recorded media programs, a user's scheduled recordings of future media programs, etc.—media program recommendations using EPG data, ARM data, editorial content, etc., available to the intermediate device and the user's channel lineup. The generated media program recommendations can be provided to the client on demand, from time to time, with asynchronous updates, etc. For example, client device 106, which may be a tablet computer, can be configured to receive media program recommendations, which are generated by multimedia device 100 using EPG data, ARM data, editorial content, etc., available to multimedia device 100. The media program recommendations generated by multimedia device 100 can be presented to the user at client device 106 or multimedia device 100.

In some embodiments, some or all of media program recommendations can be generated by a combination of a client, an intermediate device, a program trending server, etc. Each of these devices can generate—based on at least a part of user's viewing preference, user interactions, a user's channel usage, a user's recorded media program history, a user's currently available recorded media programs, a user's scheduled recordings of future media programs, etc.—media program recommendations using EPG data, ARM data, editorial content, etc., available to that device and information about the user's channel lineup. The generated media program recommendations from each device can be provided to the client on demand, from time to time, with asynchronous updates, etc. For example, client device 106, which may be a tablet computer, can be configured to generate media program recommendations locally, receive media program recommendations, which are generated by multimedia device 100 using EPG data, ARM data, editorial content, etc., available to multimedia device 100, receive media program recommendations, which are generated by program trending server 103 using EPG data, ARM data, editorial content, etc. The media program recommendations generated by multimedia device 100 can be presented to the user at client device 106 or multimedia device 100.

7.0 Generating Media Program Recommendations

Figure 4:
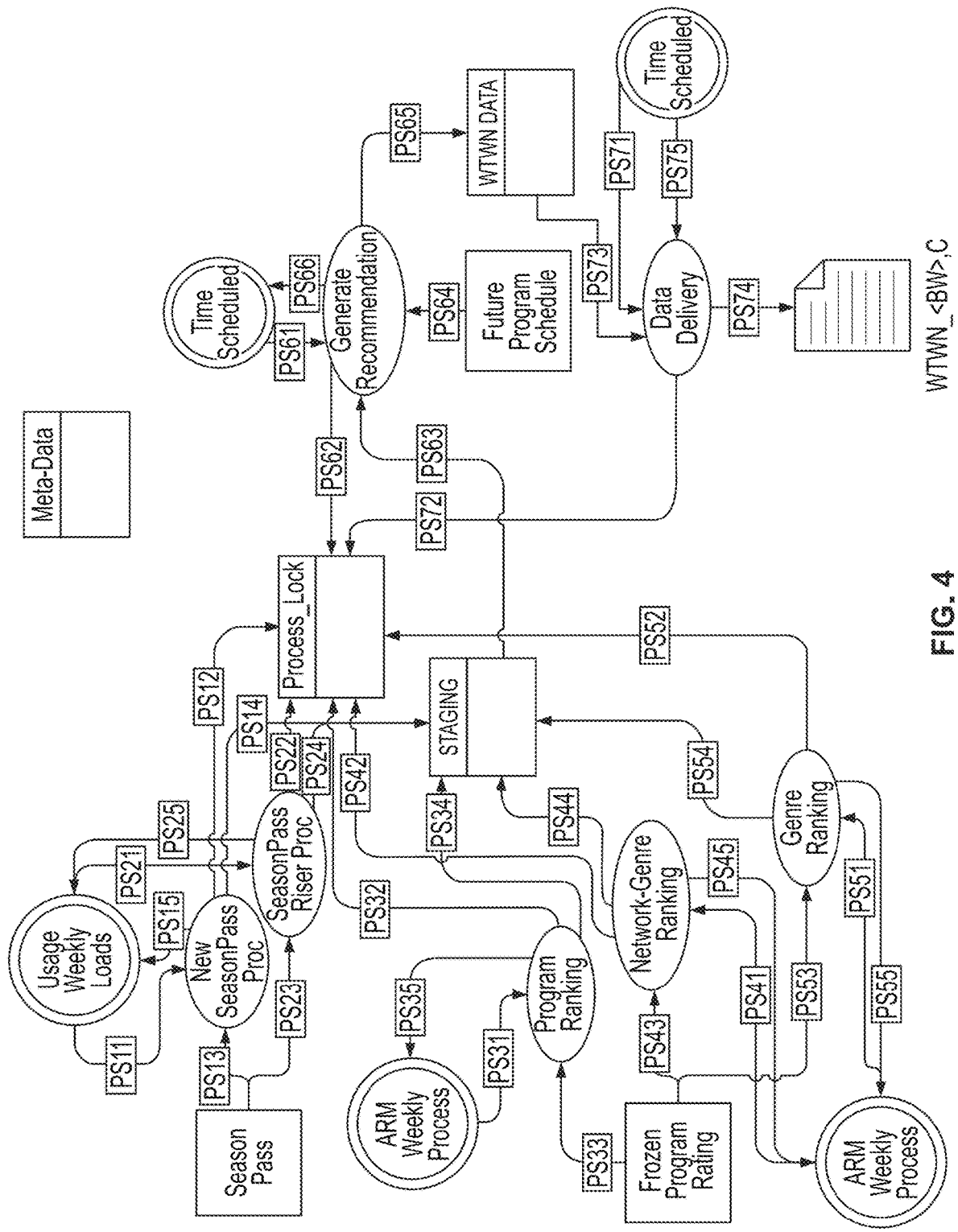
FIG. 4 depicts example data flows for generating media program recommendations based on program trending data.

FIG. 4 depicts example data flows for generating media program recommendations based on program trending data. For the purpose of illustration only, the data flows are used to generate recommendations or media program recommendations for a broadcast week N. Recommendations or media program recommendations for a different time period (e.g., next five days, next day, etc.) can be similarly generated with similar data flows.

In an example implementation, to determine media program recommendations for the broadcast week N, the data flows make use of the following ARM data sets: USAGE Season pass loads till week N–1, which may be used for detecting big risers (or media program with big rises) in popularity, detecting a new media program series in a season pass list, detecting a season pass that has a large number of signups, etc.; frozen ratings loads in the ARM data (e.g., frozen ratings determined based on user interactions and usages, etc.) related to media programs till the end of week N–3 or till a time at which frozen ratings loads is complete; scheduling data (e.g., Tribune Program Guide, etc.) loaded for week N to N+2, which may be used to determine a recommendation list; etc.

Process 10 (denoted as "New SeasonPass Proc") is configured to provide any, some, or all of the following functionality: 1) receive or query usage weekly load (e.g., the ARM data, channel usage statistics, season passes statistics, etc.) following a completion of weekly season pass load (denoted as "PS11"); 2) read data from source for new season pass (denoted as "PS13") and load into temp table (denoted as "PS14"); 3) run validation on the temp table; 4) insert a row in the process lock table so that downstream process are aware of the data availability (denoted as "PS12"); 5) run in parallel with Processes 20, 30, 40 and 50; 6) insert the temp data into Staging table; 7) release lock and end process; etc.

Process 20 (denoted as "SeasonPass Riser Proc") is configured to provide any, some, or all of the following functionality:1) receive or query usage weekly load following a completion of weekly season pass load (denoted as "PS21"); 2) read data from source for popular season pass (denoted as "PS23") and load into the staging table (denoted as "PS24"); 3) run validation on the temp table; 4) insert a row in the process lock table so that downstream process are aware of the data availability (denoted as "PS22"); 5) run in parallel with Processes 10, 30, 40 and 50; 6) release lock and end process; etc.

Process 30 (denoted as "Program Ranking") is configured to provide any, some, or all of the following functionality: 1) receive or query ARM weekly load following a completion of ARM weekly data release (denoted as "PS31"); 2) read data from source for program ranking (denoted as "PS33") and load into temp table (denoted as "PS34"); 3) run validation on the temp table; 4) insert a row in the process lock table so that downstream process are aware of the data availability (denoted as "PS32"); 5) run in parallel with Processes 10, 20, 40 and 50; 6) load into the staging table; 7) release lock and end process; etc.

Process 40 (denoted as "Network-Genre Ranking") is configured to provide any, some, or all of the following functionality: 1) receive or query the ARM weekly load and has to happen post completion of the ARM weekly data release (denoted as "PS41"); 2) read data from source for Network-Genre ranking (denoted as "PS43") and load data into temp table (denoted as "PS44"); 3) run validation on the temp table; 4) insert a row in the process lock table so that downstream process are aware of the data availability (denoted as "PS42"); 5) run in parallel with Processes 10, 20, 30 and 50; 6) load into the staging table; 7) release lock and end process; etc.

Process 50 (denoted as "Genre Ranking") is configured to provide any, some, or all of the following functionality: 1) receive or query the ARM weekly load following a completion of the ARM weekly data release (denoted as "PS51"); 2) read data from source for Genre ranking (denoted as "PS53") and load data into temp table (denoted as "PS54"); 3) run validation on the temp table; 4) insert a row in the process lock table so that downstream process are aware of the data availability (denoted as "PS52"); 5) run in parallel with Processes 10, 20, 30 and 40; 6) load into the staging table; 7) release lock and end process, etc.

Process 60 (denoted as "Generate Recommendation") is configured to provide any, some, or all of the following functionality: 1) read data from stage table (denoted as "PS63") and choose a date range (denoted as "PS61"), which may be greater than or equal to the range of data sets to be delivered or used by a "Mind" device (e.g., a "localMind" device, a "remoteMind" device, etc.); 2) make data available in temp table; 3) apply filters of one or more rules that may have been configured; 4) run validation on the temp table; 5) acquire lock for a specific week in the process lock table so that data in the same week which is being updated by Process 60 is not updated by any predecessor process or used by a downstream process; 6) perform re-ranking operation on data sets and load into a target table (denoted as "WTWN DATA" in a data flow denoted as "PS65"); 7) release lock and end process; etc.

Process 70 (denoted as "Data Delivery") is configured to provide any, some, or all of the following functionality: 1) acquire lock on the week in the process lock table so that the data for the same week to be updated is not being updated by predecessor process; 2) read data from the target table (denoted as "PS73") and choose a specified date range (denoted as "PS71"); 3) pipe the data to a file (e.g., "WTWN_<BW>.csv", etc.) and format the file (denoted as "PS74"); 4) transfer (e.g., FTP) the file to a "Mind" device or server; 5) release lock and end process; etc.

Process 70 (denoted as "Data Delivery") can be triggered through the time based scheduling (e.g., "Time Scheduled") in response to receiving a request from the "Mind" device or server. Process 60 (denoted as "Generate Recommendation") can be triggered through time based scheduling and can run more frequently than Process 70.

In the processes illustrated, a process lock table may be used to handle access conflicts and/or process contention, as most re-statements or updates of data may involve truncation of partitions, and data definition language (DDL) operations.

In the example data flow diagram of FIG. 4, season pass (ranking, fact, source, etc.) tables may be updated, organized, etc., for each week. Similarly, in the example data flow diagram of FIG. 4, explicit program (rating, fact, source, etc.) tables may be updated, organized, etc., for each day. Other ways, other time periods, etc., of updating, organizing, etc., can also be used for these tables.

Program schedule tables that store future schedules can also be used to generate recommendations or media program recommendations for media programs. Information generated for a recommended media program may comprise a unique media program identifier, program airing date, day of week (e.g., MON, TUE, WED, THU, FRI, SAT, SUN), start hour (e.g., 21:00:00, 21:15:00, 21:30:00, 21:45:00, etc.), rank, source of rank, etc.

In some embodiments, media program recommendations in a plurality of trending categories can be generated (e.g., based in part on the data flow as illustrated, a different data flow, etc.). Media program recommendations in different trending categories can be updated on different time schedules and/or different time resolutions (e.g., every half hour for the trending category "Popular On Now," every quarter hour for the trending category "Popular On Now—Kids", etc.). A response to a query for media program recommendations may cause media program recommendations to be given for a length of time (e.g., 24 hours, 48 hours, etc.).

8.0 Example Algorithms

In some embodiments, one or more algorithms can be used (e.g., at a program trending server, at a "remoteMind" device, etc.) to identify recommendations or media program recommendations from anonymous samples (e.g., to protect viewer privacy, etc.) in the ARM data collected from a selected audience.

For example, when a media program is determined as belonging to a series, a season pass rank may be assigned to the media program. New entries for season passes can be identified as the media programs that did not have a season pass rank, or alternatively did not have a high enough season pass rank, in a preceding time period (e.g., previous week, etc.), but has been assigned a season pass rank, or alternatively given a high enough season pass rank (e.g., top 3000 season passes, etc.), in a current time period (e.g., the current week, etc.).

Big risers for season passes can be identified as the media programs that have a rise in subscription over a certain threshold (e.g., a percentile threshold of 2%, 3%, etc.) in the current time period in relation to a previous time period. Season pass percentile subscription may be calculated based on the number of season passes set up each week. In an embodiment, a rise in season pass percentile subscription for week N is equal to (previous week percentile subscription—current week percentile subscription) divided by previous week percentile subscription. This computation can be performed when the previous week value is not zero or blank.

Media programs pertaining to a series or a season pass are not associated with one particular day of the week or time of day. In week N, if the name of a media program in EPG data matches that of a new entry for a season pass for any airing (e.g., any day, time, rerun flag (indicating first-run or repeat-run), etc.), the media program may be given consideration as to whether it should be a media program recommendation.

Certain media programs (e.g., service data, paid program or programming, to be announced, unidentified program or programming, local programming, etc.) can be excluded in computation that determines new entries for season passes or big risers in season passes.

To identify top rated media programs, total Program ratings of a past time period (e.g., the latest week for which total program rations of media programs are available, etc.) can be used to rate media programs. Up to a certain number of top rated media programs that become available for a time period (e.g., the upcoming week, etc.) can be determined based on the total program rating.

In some embodiments, ARM data including but not limited to media program ranking data from one or more selected networks may be included in the determination for top rated media programs.

Media programs can be ranked per combination of day of week, start hour and rerun flag (e.g., first-run, second-run, etc.). For start hour, a day can be divided into a plurality of small time intervals (e.g., 48 half hour buckets like 8:00:00, 8:30:00, 9:00:00, etc.). Media programs with start time within 10 minutes of a specific start hour can be considered for a start hour bucket with the specific start hour. For example, programs that start between 7:50 pm and 8:10 pm can be included in the 8 pm start hour bucket.

Total Program ratings (e.g., for national market, etc.) of frozen ratings of a past time period (e.g., last 52 weeks, etc.) can be used to identify up to a certain number of top rated network-genres and/or top-rated genres that become available for a time period (e.g., the upcoming week, etc.).

Program schedules (e.g., Kantar program schedule, etc.) comprising program schedule information for relatively old dates may be considered in identifying top rated network-genres and/or top-rated genres. The start date may be Monday of the first week and end date will be Sunday of the last week. Genre names may be determined from a program guide schedule (e.g., EPG data, Tribune program schedule, etc.).

In some embodiments, a further program schedule of one, two, or more weeks for media programs provided by a plurality of media program sources can be generated as a part of identifying the presence of recommended media programs for which media program recommendations may be provided to users. The future program schedule may be time-wise divided into a plurality of time buckets (e.g., half hour buckets, etc.).

In some embodiments, to generate media program recommendations from media programs in week N airing, the following logic can be applied for determining top shows in each of trending category in week N airings (e.g., within specific time buckets in a future program schedule).

A media program to be considered for a specific half hour bucket has to either start in that half hour or span over a certain amount of time (e.g., 25 minutes, 30 minutes, etc.) in the time duration for that half hour bucket. For example a program that starts at 4 pm and is 2 hour long, it can be included as a candidate for a media program recommendation at 4 pm, 430 pm, 5 pm and 530 pm. In some embodiments, a media program can be included for a specific time bucket with a specific start hour only if at least 20 minutes—this is for illustration purposes; other time durations such as 15 minutes, 25 minutes, etc., may be used in different implementations—of programming is still remaining for that media program. For example, a media program that starts at 4 pm and ends at 5:15 pm may be included for the half hour buckets with start hours 4 pm and 430 pm, but it will not be included for the half hour bucket with a start hour 5 pm (since only 15 minutes of the program is remaining).

In some embodiments, for season pass new entries, only media program names are matched (e.g., matching the name of a discovered season pass new entry with the name of a media program in week N airings, matching the name of a discovered season pass new entry with the name of a media program in the future program schedule, etc.), since rerun flag, day of week and time of day may not be available for season passes in the program schedule. In some embodiments, media program recommendations that are season pass new entries may be assigned the highest rank order in (e.g., all, etc.) media program recommendations, and ordered internally and/or in a display by current week (N) season pass rank. In some embodiment, a first run flag may be set for some or all of the season pass new entries.

In some embodiments, for season pass big risers, only media program names are matched (e.g., matching the name of a discovered season pass new entry with the name of a media program in week N airings, matching the name of a discovered season pass big riser with the name of a media program in the future program schedule, etc.), since rerun flag, day of week and time of day is not available for season passes. In some embodiments, media program recommendations that are season pass big risers may be assigned the second highest order in media program recommendations, and ordered internally and/or in a display by percentile change in season pass rank in descending order.

In some embodiments, for top rated programs, a plurality of values such as the following example four values may be matched between top rated programs of a previous time period (e.g., last week, etc.) and media programs in the current time period (e.g., current week airings, etc.): day of week, start hour, rerun flag and media program name. In some embodiments, media program recommendations representing top rated programs may be assigned the third highest order in media program recommendations, and ordered internally and/or in a display by the next day program rating in descending order.

In some embodiments, for top rated network-genres, a plurality of values such as the following example four values may be matched between top rated programs of a previous time period (e.g., last week, etc.) and media programs in the current time period (e.g., current week airings, etc.): day of week, start hour, rerun flag and network-genre. In some embodiments, media program recommendations representing top rated network-genres may be assigned the fourth highest order in media program recommendations, and ordered internally and/or in a display by the total program rating in descending order.

In some embodiments, for top rated genres, a plurality of values such as the following example four values may be matched between top rated programs of a previous time period (e.g., last week, etc.) and media programs in the current time period (e.g., current week airings, etc.): day of week, start hour, rerun flag and genre. In some embodiments, media program recommendations representing top rated network-genres may be assigned the fifth highest order in media program recommendations, and ordered internally and/or in a display by the total program rating in descending order.

Media program recommendations identified by different algorithms and/or different processes can be merged and duplicates can be removed. Ranking can be regenerated such that new entries in season passes are ranked topmost in order of current week season pass rank, followed by big risers in season passes in order of percentile change in season rank, followed by top rated programs from previous week in order of average next day rating, followed by programs belonging to top network-genres in order of average total program rating, followed by programs belonging to top genres in order of average total program rating. Filtering can be further applied to the media program recommendations for each of one or more rule sets (e.g., to generate a sufficient number of media program recommendations and/or to prevent too many media program recommendations in each of the trending categories, etc.)

In some embodiments, a device (e.g., a program trending server, a "Mind" device which may itself be a program trending server, etc.) generates or receives popularity reports (e.g., weekly "popularity" reports, etc.) based on the ARM data and/or editorial content. The popularity reports comprise media program recommendations or candidates for media program recommendations using one or more algorithms as described herein. In some embodiments, these reports list the top-ranked popular upcoming shows for 30-minute segments throughout a current week (e.g., different segments such as 15-minute segments, etc., may be used for different trending categories such as kids shows, etc.). One type of popularity reports may comprise shows and rankings based on a specific region or a time zone (e.g., specific East Coast lineups, etc.). Popularity reports from the East Coast lineups may be denoted as the East Coast Popularity Report (ECPR). Media program recommendations and/or candidates for media program recommendations for one or more different regions or time zones may be derived from popularity reports (e.g., the ECPR, etc.) for a different region or time zone (e.g., the East Coast, etc.).

9.0 Media Program Recommendations in Different Time Zones

The ECPR offers may not match program schedules for actual viewers in regions or time zones other than the East Coast. For example, viewers in different regions or time zones, in different networks, etc., may have different channel lineups. In addition, national and/or local networks may offer shows at different local times based on time zones and/or local schedules.

In order to match the local offerings specific to a user to the ECPR, the ECPR report may be treated as a local time zone report for each local schedule. The local offers are compared with the ECPR offers within a configurable time zone offset window, such as (−2 hours, +1 hour), etc. For instance, if the time zone offsets window is (−1 hour, +1 hour) and if the ECPR report recommends a show or a media program in the 8 pm-8:30 pm slot, the media program in the ECPR report may be matched with all local offerings of the show or the media program between 7 pm and 9:30 pm. In some embodiments offers for the media program within the 8 pm-8:30 pm slot (e.g., the same time slot as in the ECPR report for the media program, etc.) may be favor first, followed by any offer in the 7:30-8 pm and 8:30-9 pm slots (e.g., 30 minutes away from the corresponding East Coast time for the media program, etc.), then followed by 7 pm-7:30 and 9 pm-9:30 slots (e.g., 60 minutes away from the corresponding East Coast time for the media program, etc.).

Additionally, alternatively, optionally, a background process may be used to pre-match the ECPR reports to local offers in a number of time zones instead of waiting for the completion of the ECPR reports and then extending the ECPR reports. This may be used to provide faster real-time lookup.

Some or all of media program recommendations in a plurality of trending categories available to a client can be presented to a user to allow the user to quickly view and select from media programs that are available to watch immediately or at a later time, to schedule a recording immediately or at a later time, etc.

A certain number of (e.g., 10, etc.) channels may be provided as media program recommendations in the trending category "Favorite Channels." The favorite channels may be ordered (e.g., by the time and frequency of viewing and/or recording by the user, etc.). The program trending application can allow the user to add or remove a favorite channel, recorder the favorite channels, fix a static selection and/or order of the favorite channels, etc. In some embodiments, if the user does not make the favorite channels static, the composition of favorite channels can be updated from time to time (e.g., once per week, once every three days, etc.). In some embodiments, thumbs (e.g., statistics of thumbs up and down, etc.) data for this category may be ignored. Media program recommendations may be gathered as needed (e.g., in real time, in near-real time, etc.). In some embodiments, channel numbers may be sorted in ascending channel order, from the lowest channel number to the highest. If two channels are airing a show with the same Content ID, display an HD show before an SD show. In some embodiments, if there are two or more HD shows with the same Content ID, a tie-break rule may be applied (e.g., display the one on the first channel encountered in a program guide, etc.).

A certain number of (e.g., 10, etc.) shows may be provided as media program recommendations in the trending category "Recommended Shows." The recommended shows may be currently airing programs. A number of factors (e.g., liked by friends in a social network such as Facebook, liked by a sample of representative viewers, liked by audience in a different time zone that has aired the shows, etc.) may be used to select shows recommended. In the event that there are not enough currently airing friend recommended shows, the balance of the list can be populated by media program recommendations in a different trending category (e.g., "What's Popular," etc.).

A certain number of (e.g., 10, etc.) shows may be provided as media program recommendations in the trending category "Liked by Friends." The shows may be currently airing programs that are derived from ratings (e.g., "Facebook Likes," etc.) of friends in one or more social network sites. The shows may be prioritized in descending order beginning with the highest rated show as designated by the number of "Likes". The composition of media program recommendations can be updated from time to time (e.g., once per week, every three days, etc.) based on information received from the social network sites.

In some embodiments, when a media program recommendation is displayed in the "Liked by Friends" category, a user may be presented up to a certain number of (e.g., three, etc.) names of friends who also like the media program corresponding to the media program recommendation. If more than the certain number of friends like the media program, the remaining number of friends who like the show should be displayed numerically (e.g., Mark, Jeff, Matt and seven others like this program, etc.).

A certain number of (e.g., 10, etc.) shows may be provided as media program recommendations in the trending category "Popular on Live TV." These shows may have been selected or determined as the most popular shows and movies currently airing/available based on program trending data (e.g., season pass data captured by the ARM data, etc.). For example, the ARM data may identify the 20 most popular shows at any given time of the day, divided into 30-minute increments. These may be combined with editorially curated shows that are expected to be popular. Editorial items may include but are not limited any of: repeated events (live and recorded), award shows and sports programs, single event (live and recorded), non-repeated popular TV live or recorded event such as presidential debates, etc. Editorial items may also include but are not limited any of: season premiere including but not limited to all pilots and season premieres, changes in regular air times, etc. Editorial items may include but are not limited any of: trending content Includes TV shows that are suddenly popular on the Internet—this is usually unpredictable, may not persist for a long time, and thus is difficult to capture in the programmatic feeds generated based on past information. Media program recommendations may be gathered periodically (e.g., daily, weekly, etc.) with separate feeds on a more frequent basis (e.g., for every half hour, etc.).

A certain number of (e.g., 10, 20, etc.) shows may be provided as media program recommendations in the trending category "My Shows." These shows may be from a list of recorded media programs stored at a client (e.g., client device 106, etc.) or stored at a device connected with the client (e.g., multimedia device 100, etc.). A program trending application as described herein may display up to a certain number (e.g., 20, etc.) of the most recent additions to the "My Shows" category. In some embodiments, this category include downloads but exclude suggestions. In some embodiments, there is one-item limit per series in the category. Duplicate results from one or more wish lists may be eliminated (e.g., separate wish lists specify two actors in the same show, etc.).

A certain number of (e.g., 10, etc.) shows may be provided as media program recommendations in the trending category "Shared YouTube Videos." These shows may be YouTube videos shared by friends via Facebook. The user may have a linked Facebook account. The program trending application at the client may be configured to allow the user to select a video from within the program trending application and playback through an external display device (e.g., display device 102-1 through multimedia device 100, etc.) or directly on the client (e.g., display device 102-2 integrated with client device 106, etc.). The media program recommendations in the trending category "Shared YouTube Videos" may be updated from time to time (e.g., once per week, every three days, etc.)

A certain number of (e.g., 10, 25, etc.) shows may be provided as media program recommendations in the trending category "Sports on Live TV." One or more devices that generate media program recommendations can be configured to scan/filter EPG data and a user's channel lineup for live sporting events. In an example, when the user clicks on a media program for a particular sports event as represented by a media program recommendation, a display device (e.g., 102-1, etc.) may display the media program for the sports event based on a feed of the media program provided by a tuner (e.g., in multimedia device 100, etc.). The media program recommendations can be ordered and/or grouped by live sports, other sports on TV, etc. This category may include live events and reruns of live events. Media program recommendations can be gathered as needed. Live events may be displayed before non-live events for each type of sports events. Live events may be indicated to a user with live markings. Within each type of sports, games with the highest rating (e.g., from Thuuz, etc.), and then continue in descending order of ratings. Games without ratings may be displayed last in the category. A rating for an upcoming event may be displayed with a different look than that with which a rating of a live event may be displayed. Types of sports may include but are not limited to any of: Football, Baseball, Basketball, Hockey, Auto Racing, Golf, Tennis, Soccer, and Others. "Soccer" events may further include the following genres: soccer, international soccer, football (soccer), etc.

A certain number of (e.g., 10, 25, etc.) shows may be provided as media program recommendations in the trending category "New On Demand Movies." These shows may be available from broadband sources (e.g., Netflix, Amazon, etc.), video on demand or VOD where applicable, etc. The program trending application at the client may be configured to allow the user to select a video from within the program trending application and playback through an external display device (e.g., display device 102-1 through multimedia device 100, etc.) or directly on the client (e.g., display device 102-2 integrated with client device 106, etc.). In some embodiments, when the user selects a movie for viewing, the program trending application should launch an appropriate application to cause the media program to be shown on a TV.

If a movie is available from multiple sources, the multiple sources may be presented to a user in a priority order for the multiple sources. A source may be preferred over another source. The movies in this category can also be ordered in a reverse chronological order, from most recent original release date to the oldest original release date. The new-on-demand movies in this category may be updated on a relatively short time basis (e.g., daily, etc.).

The program trending application can be configured to display media program recommendations in available trending categories in a default setting, and enable a user to customize displaying the available trending categories. For example, the program trending application can allow the user to turn on the "Sports on Live TV" category, but turn off the "What's Popular" category. If a category has too few media program recommendations or no media program recommendations, the program trending application can skip displaying the category.

In an embodiment, when a user highlights a media program recommendation in a plurality of media program recommendations on a display, an icon representing a link to a Rotten Tomatoes review of the movie can be displayed within an information pane. In an embodiment, when a user is watching a movie, the program trending application can be configured to allow the user to access an additional option on an information display that displays icons representing links to Rotten Tomatoes reviews. If a selection of such a link is made by the user, one or more of the reviews may be displayed in a separate display page, a separate browser session, within the program trending application, etc.

An information pane or display as described herein may comprise a link to IMDB for a particular movie or show displayed. When the user selects the link, an appropriate IMDB page can be displayed within the program trending application, in a separate browser session, etc. A cast member information pane or display may be displayed for a user for a highlighted media program or for a selected media program. The information pane or display may comprise a link to the appropriate IMDB page for the particular cast member. When the user selects the link, an appropriate IMDB page can be displayed within the program trending application, in a separate browser session, etc.

When a user has selected a media program that is available from Netflix, Amazon, or another internet based media service, the program trending application can provide the user an option to choose to playback the media program on an external display device (e.g., a TV through multimedia device 100, etc.) box or to choose to playback on an integrated display device (e.g., an LCD display screen, etc.) of the client. In some embodiments, if the user has selected to playback the media program on the client, the program trending application can be configured to automatically launch a Netflix application or another application compatible with the other internet based media server and (e.g., immediately by passing an information display that is not a part of the media program, immediately without being further user intervention, etc.) start playing the selected media program. In some embodiments, if the user has selected a media program requiring a purchase from Amazon, the program trending application can be configured to automatically launch a display (e.g., immediately without content information display, immediately without further user intervention, etc.) to allow the user to make the purchase, and, once purchased, start playing the selected media program. Once the user has completed watching the media program, the program trending application can be configured to close the Netflix application or the other application. The client can be configured to support downloading, pre-installing, running, etc., Netflix and other applications, which operate in conjunction with the program trending operation, and media programs corresponding to selected media program recommendations from third-party or non-third party sources.

In some embodiments, the program trending application assembles all of the responses of these calls into displays at the client. In some embodiments, the media program recommendations received from program trending server 103 contain all necessary image and text data needed to render these displays.

10.0 Example User Interface Pages

A user of a client may start a program trending application (e.g., 107, etc.) in a variety of different ways on different platforms. For example, on a tablet computer, the user may tap on an icon (e.g., a "Watch Now" icon, etc.) representing the program trending application (e.g., from a tab bar on a display screen, etc.). The program trending application may be configured to operate in a local mode (e.g., interoperating with a multimedia device 100, etc.). The program trending application may be configured to operate in a remote mode (e.g., operating without a multimedia device 100, etc.). The program trending application running on a client may be configure to use media program recommendations cached locally, generated locally, or generated in combination with other devices. A user may be able to access a user manual by directly interacting with one or more displays rendered by the program trending application (e.g., which may be configured to detect whether the user is using the application the first time, etc.). Images may be used to represent media program recommendations in displays. Different images may be used to represent a single media program. For example, when a Thuuz rating is available, an image representing a sports event may have a different brightness from an image representing the sports event if the Thuuz rating is unavailable.

Figure 5:
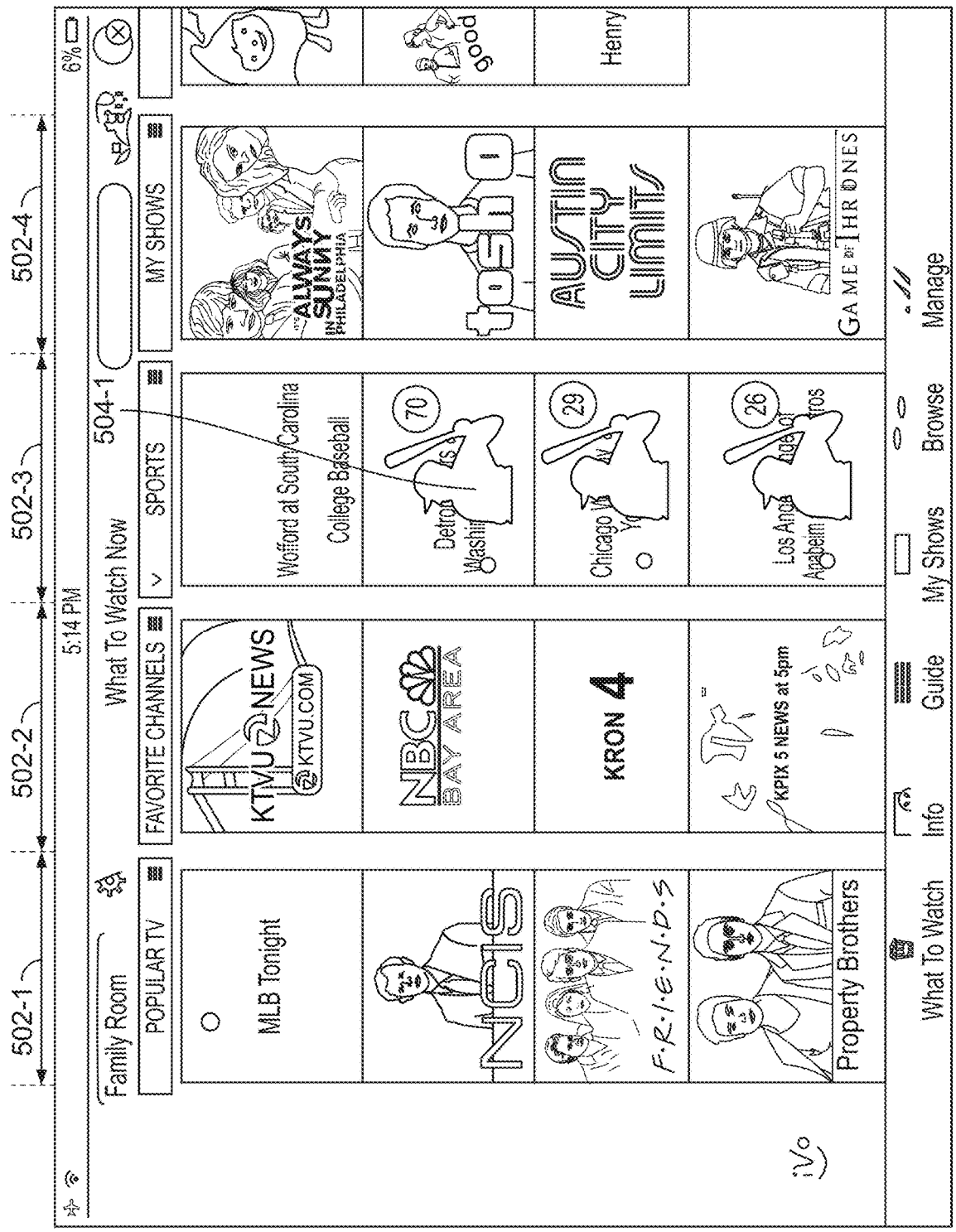
FIG. 5-12 illustrates example display pages.
Figure 9:
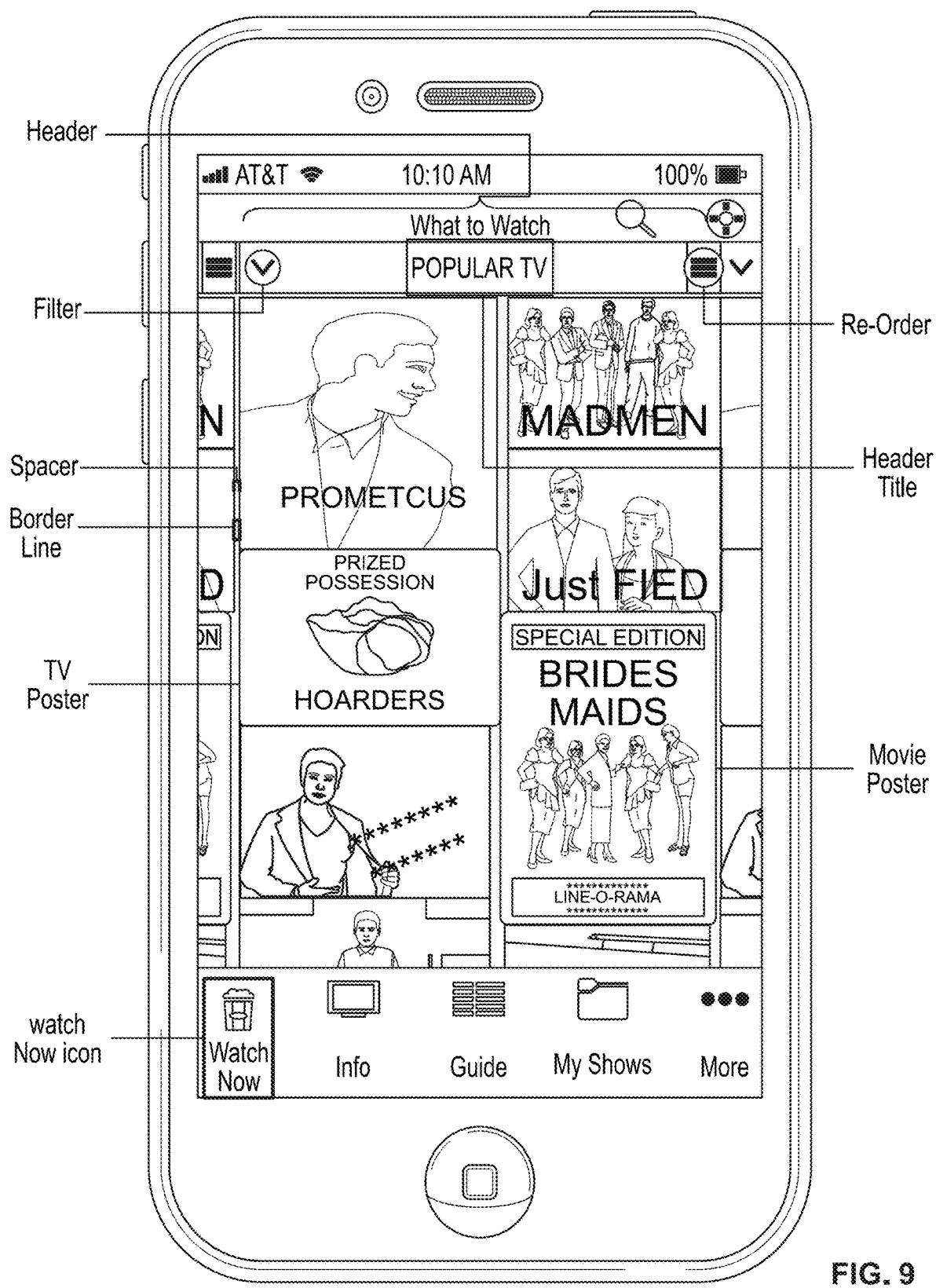
Figure 10:
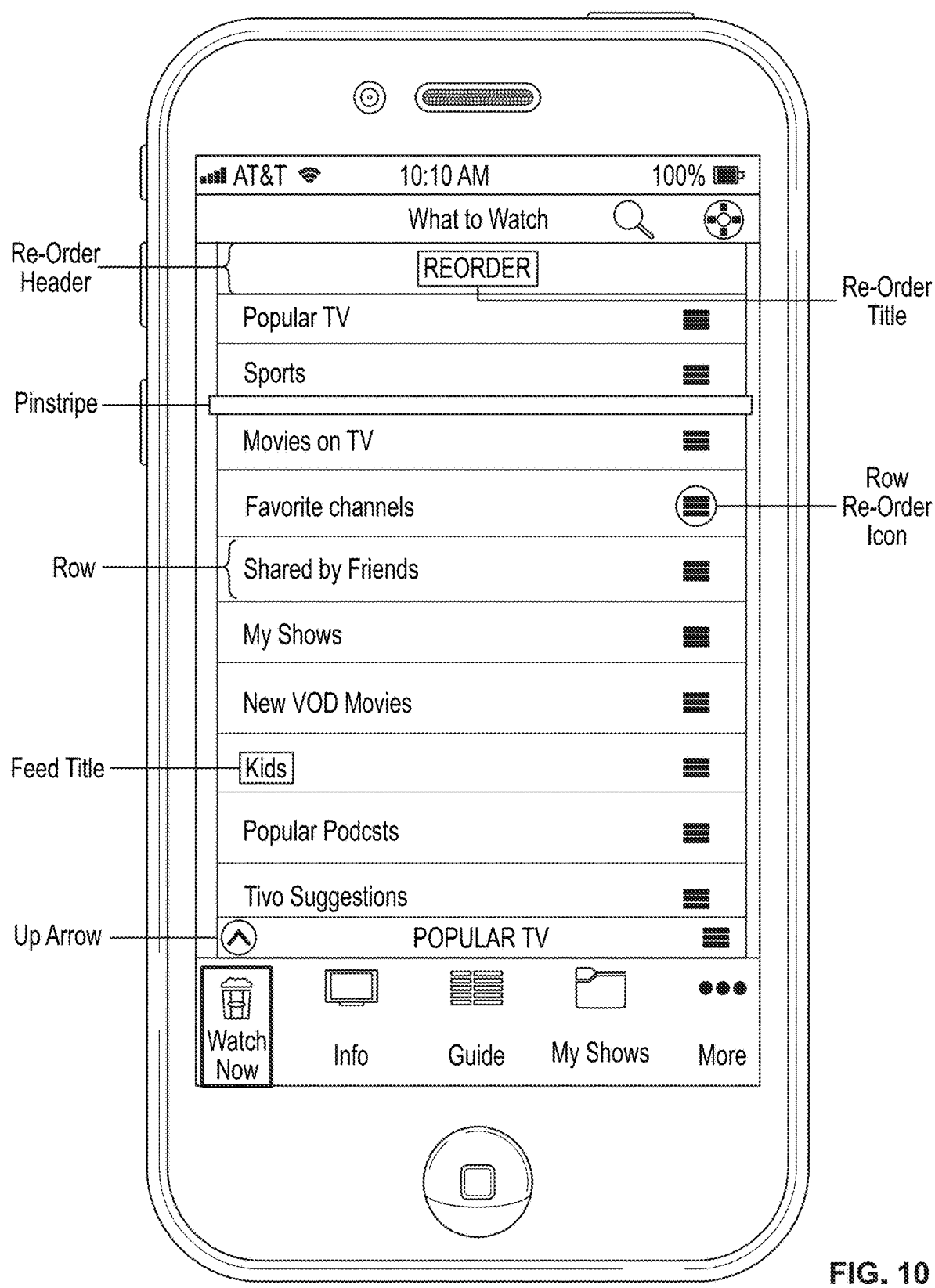

FIG. 5 illustrates a first example page of a UI for trending media programs according to an embodiment. In a non-limiting embodiment, this example page or any of other pages may be displayed on one or more of a mobile device, a handheld computer, etc. In some embodiments, the page of FIG. 5 may be rendered on a relatively large screen, whereas pages of FIG. 9 and/or FIG. 10 may be rendered on relatively small screens.

The page depicted in FIG. 5 is in a tabular format, with rows comprising row cells (e.g., 504-1, etc.) in a plurality of columns (e.g., 502-1, 502-2, 502-3, 502-4, etc.). Each row cell (e.g., 504-1, etc.) in a column (e.g., 502-3, etc.) represents an individual media program recommendation (e.g., "Detroit Tigers at Washington Nationals," etc.). Each column in the plurality of columns represents a trending category (e.g., "SPORTS", etc.) in a plurality of trending categories (e.g., "POPULAR TV," "FAVORITE CHANNELS," "SPORTS", "MY SHOWS," etc.) for the media program recommendations. In other embodiments, this page may be displayed in formats other than a table. The user may scroll through different trending categories (e.g., by swiping left or right motions, by swiping up and down motions, etc.).

Media program recommendations (e.g., "Detroit Tigers at Washington Nationals," etc.) rendered in the page of FIG. 5 are selectable by a user operating or making use of the device that renders the page for displaying.

In some embodiments, new trending categories may be added by the program trending application on displays when there are sufficient numbers of media program recommendations are available or when a user requests to do so.

Figure 6:
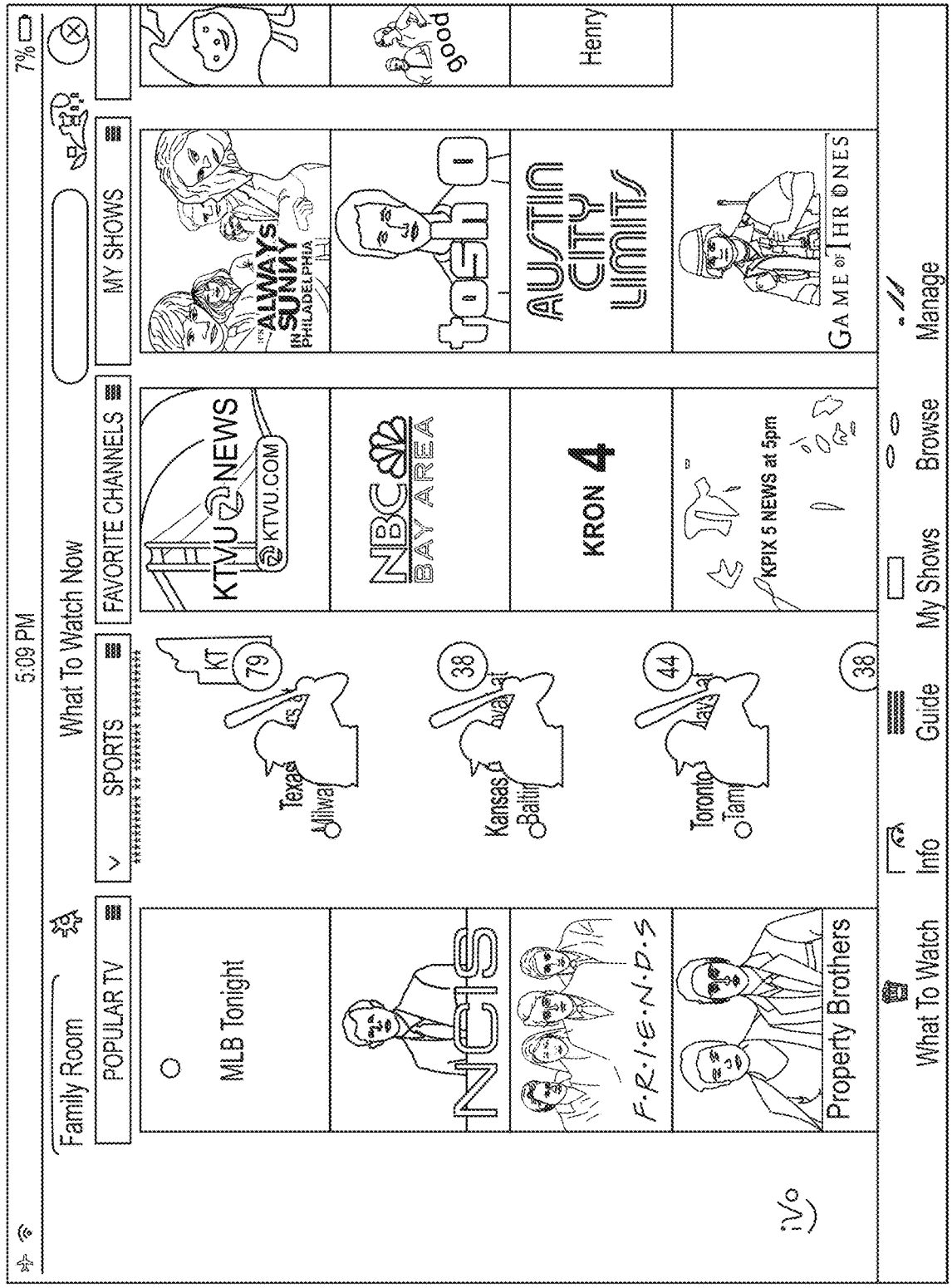
Figure 12:
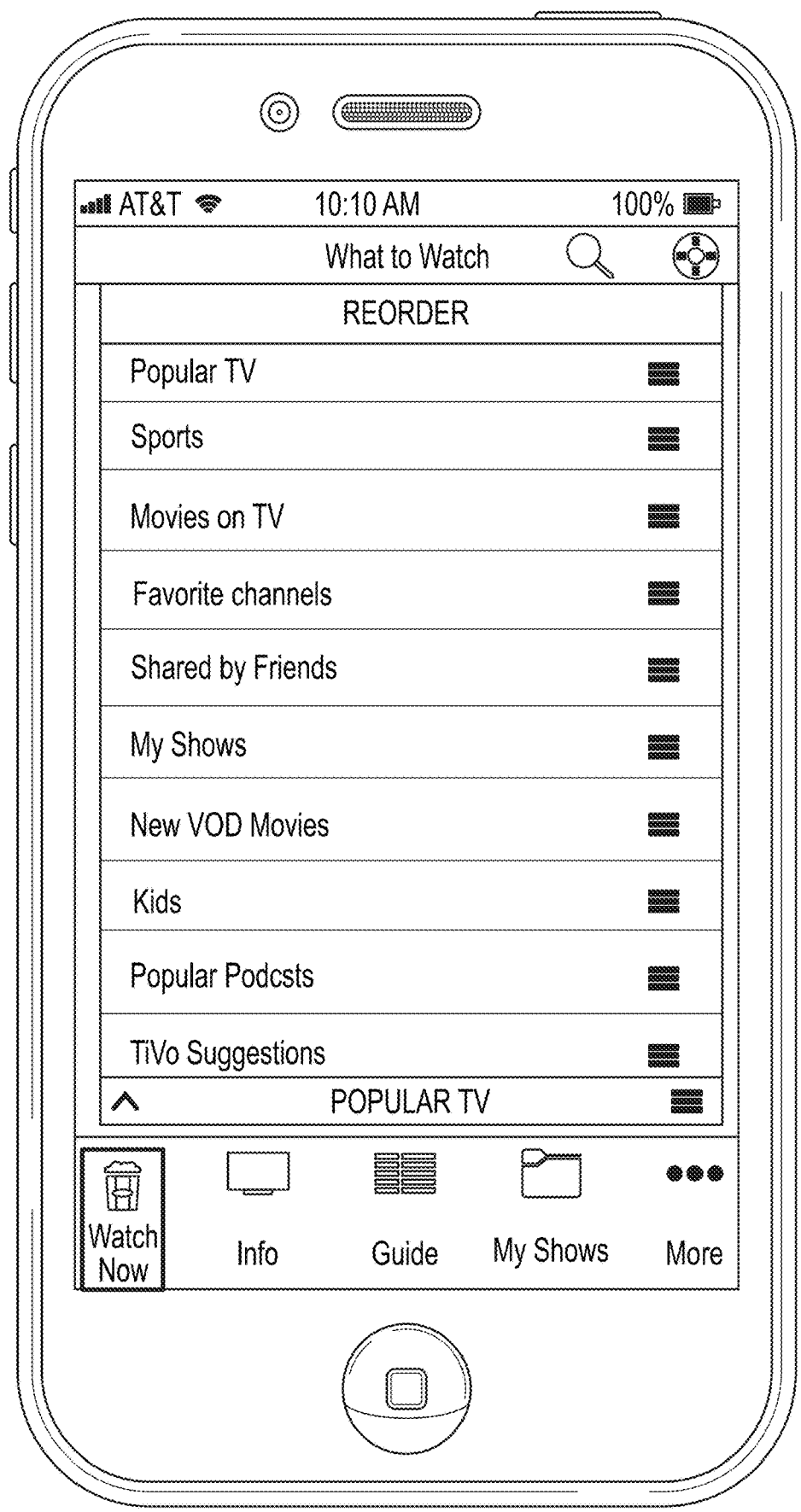

FIG. 6 illustrates a second example page of a UI for trending media programs according to an embodiment. As illustrated, a program trending application that causes this page to be rendered may be configured to allow a user to change display orderings of trending categories. For example, a user may change the "SPORTS" trending category from the third category in the page of FIG. 5 to the second category in the page of FIG. 6. In some embodiments, the page of FIG. 6 may be rendered on a relatively large screen, whereas a page of FIG. 12 configured to allow a user for reordering trending categories may be rendered on a relatively small screen.

Figure 7:
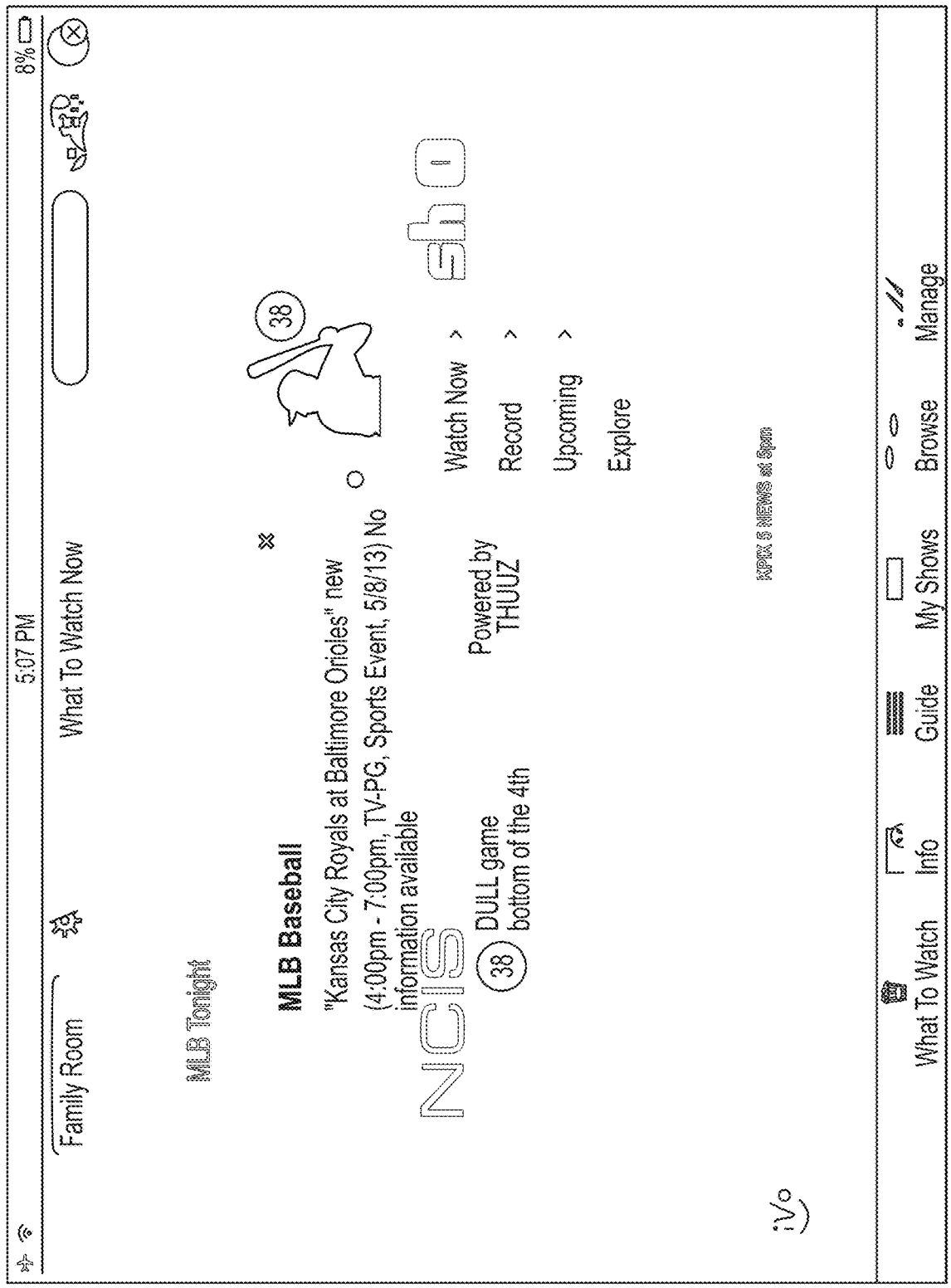

FIG. 7 illustrates a third example page of a UI for trending media programs according to an embodiment. As illustrated, a program trending application may be configured to display an information pane in response to receiving an indication that a user selects a media program recommendation (e.g., a sports event "Kansas City Royals at Baltimore Orioles", etc.). As illustrated, the information pane may include selectable options for viewing ("Watch Now"), recording, etc. The information pane may also include external reviews and information (e.g., an excitement ranking of "38" etc.), for example, from a third party (e.g., Thuuz sports discovery service, etc.).

Figure 8:
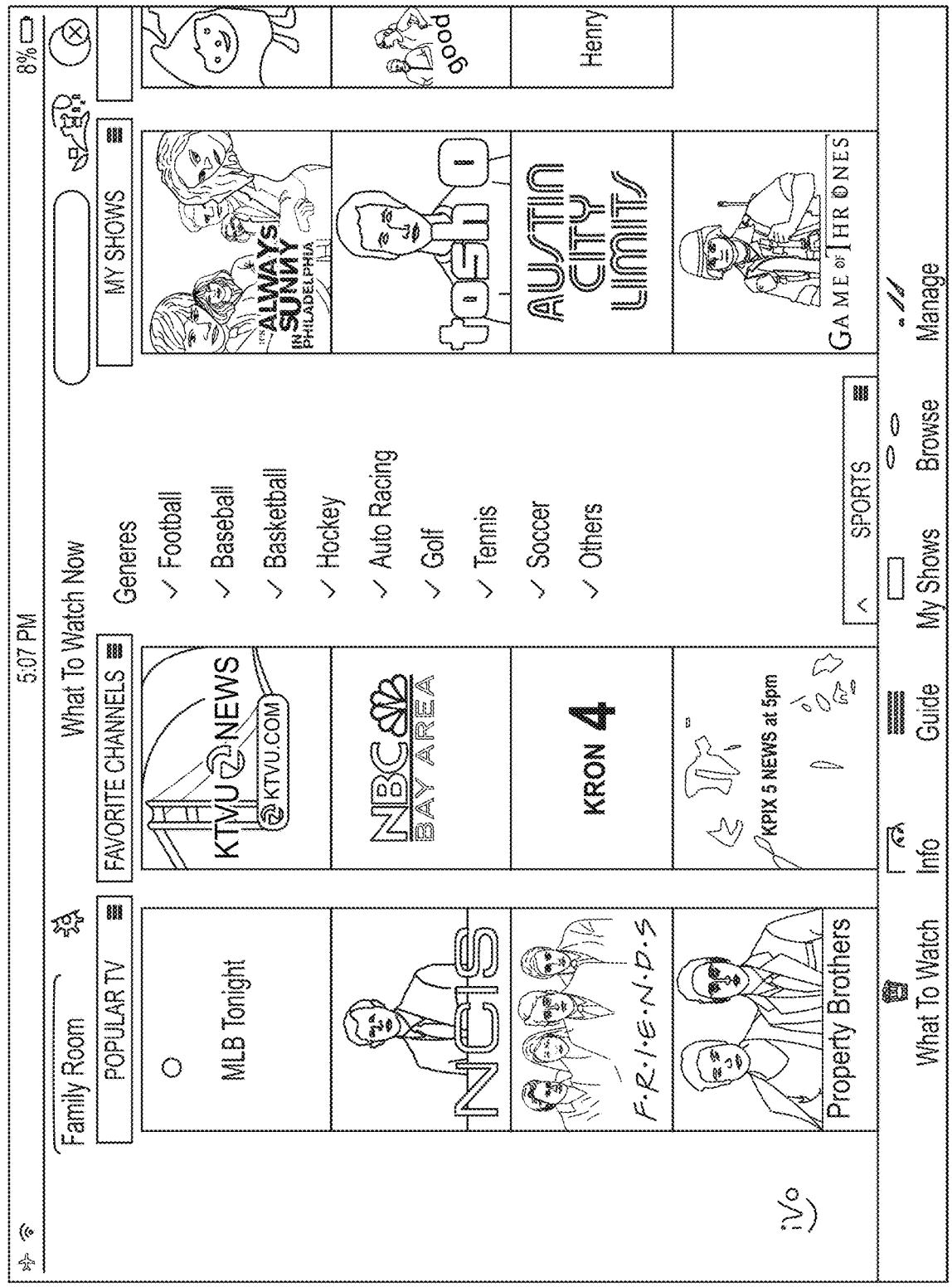
Figure 11:
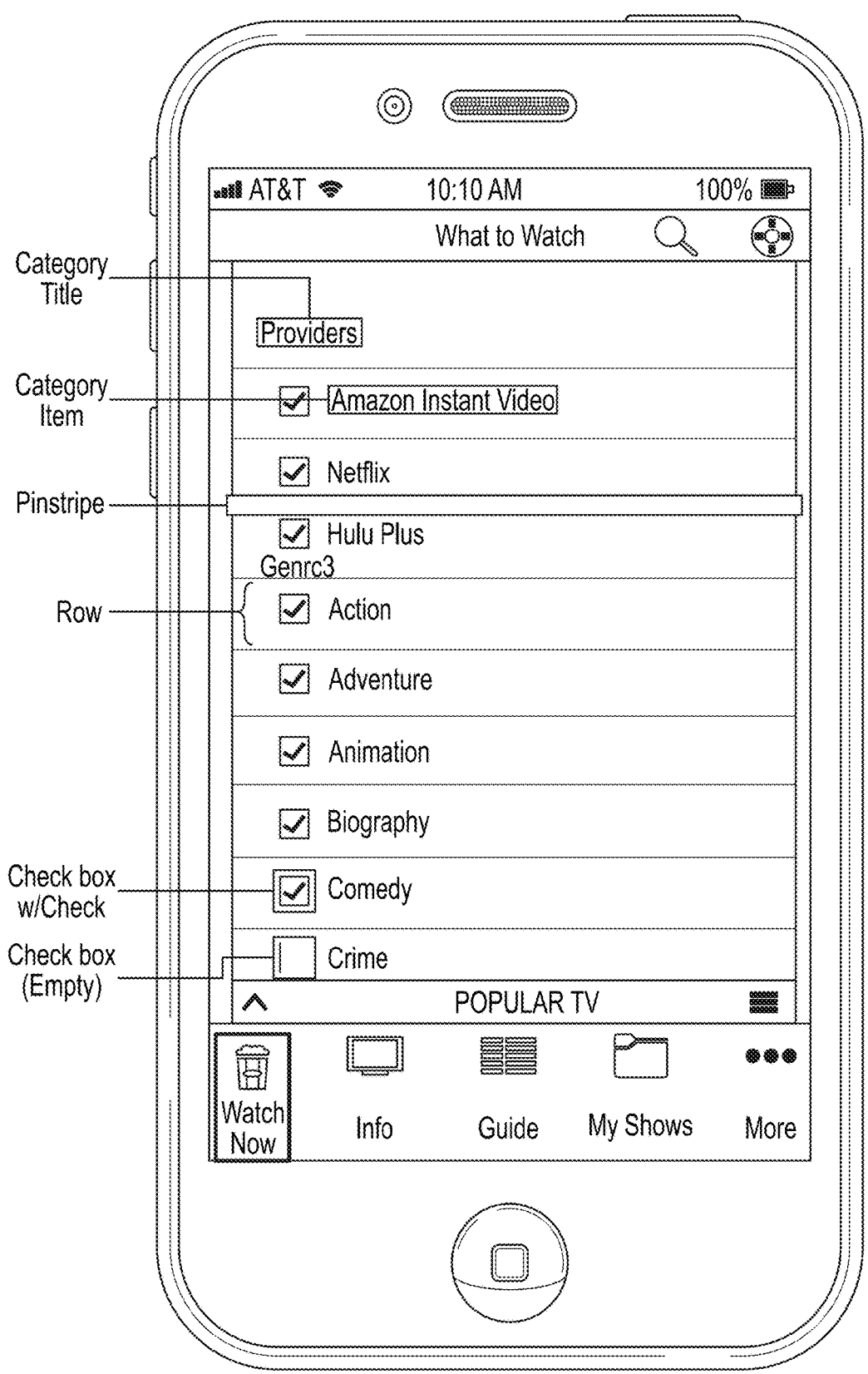

FIG. 8 illustrates a fourth example page of a UI for trending media programs according to an embodiment. As illustrated, a program trending application may be configured to display a filter setting pane comprising filter settings (e.g., various types of sports programs, etc.) for a trending category (e.g., "SPORTS", etc.) in response to receiving an indication that a user selects to edit the filter settings for the trending category. Based on user input related to the filter settings, new filter settings can be used by the program trending application and/or other devices to determine specific media program recommendations in the trending category. For example, if the user is not interested in baseball, any media program for baseball may be excluded in media program recommendations in the trending category "SPORTS". In some embodiments, the page of FIG. 9 may be rendered on a relatively large screen, whereas a page (for the purpose of illustration, "crime" has been deselected, for example, by a user) of FIG. 11 configured to allow a user to edit filter settings may be rendered on a relatively small screen.

11.0 Example Process Flows

In various embodiments, one, two or more devices such as one or more of those illustrated may be singly or jointly implement at least some of the techniques as described herein.

Figure 13:
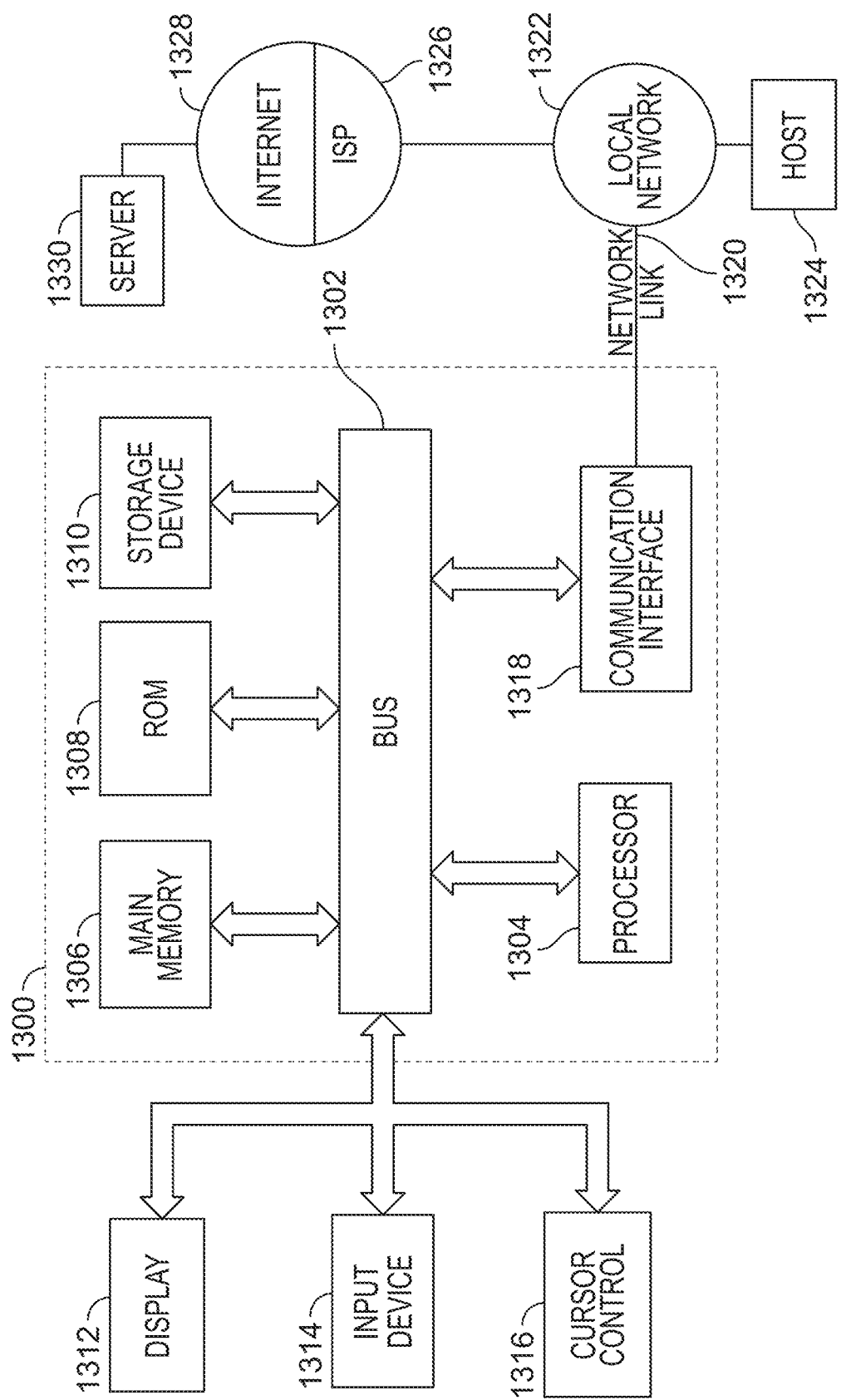
FIG. 13 illustrates a computer system upon which an embodiment of the invention may be implemented.
Figure 14A:
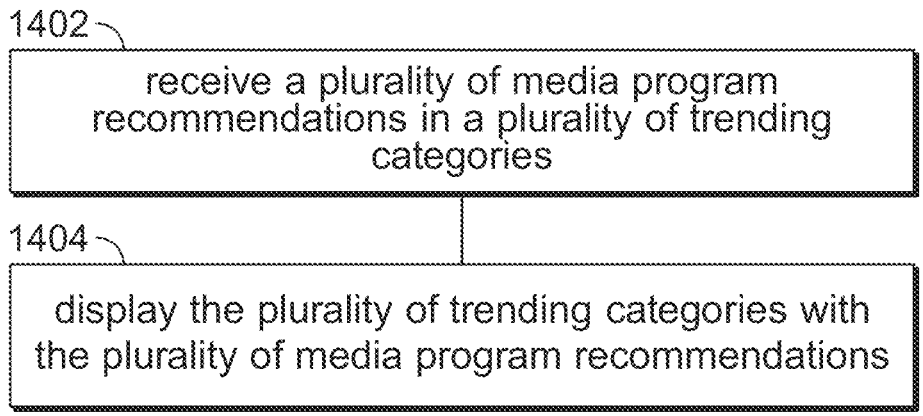
FIG. 14A through FIG. 14C illustrate example process flows.

FIG. 14A illustrates an example process flow. In some embodiments, a system (e.g., a multimedia device 100, a client device 106, or a display unit 102-1 of FIG. 1, etc.) comprising one or more computing devices (e.g., 1300 of FIG. 13) may perform this process flow.

In block 1402, the system receives a plurality of media program recommendations in a plurality of trending categories, each trending category trending media programs having one or more common trending characteristics, and each trending category in the plurality of trending categories comprising one or more media program recommendations in the plurality of media program recommendations.

In block 1404, the system displays the plurality of trending categories with the plurality of media program recommendations.

In an embodiment, one or more media programs corresponding to one or more media program recommendations in at least one trending category in the plurality of trending categories are from a remote service.

In an embodiment, one or more media programs corresponding to one or more media program recommendations in at least one trending category in the plurality of trending categories is from one or more local media sources.

In an embodiment, a method as described herein is performed by a first device; the one or more local media sources are locally connected with the first device.

In an embodiment, a method as described herein is performed by a first device being operated by a user; the user is able to select to view a media program that corresponds to a media program recommendation on either or both of the first device and one of the one or more local media sources locally connected with the first device.

In an embodiment, the plurality of media program recommendations is specifically selected for a specific user, and wherein a plurality of different media program recommendations is selected for a user different from the specific user.

In an embodiment, the system is further configured to perform: receiving a media program recommendation filter setting from a user; sending the media program recommendation filter setting to one or more sources that generate the plurality of media program recommendations; the plurality of media program recommendations is selected based at least in part on the media program recommendation filter setting.

In an embodiment, the media program recommendation filter setting is to filter media program recommendations in a specific trending category trending media programs in a specific trending category.

In an embodiment, the system is further configured to display a selectable control; the selectable control is configured to be invoked by a user to provide one or more comments related to a media program that is accessed by the user through a media program recommendation in the plurality of media program recommendations.

In an embodiment, the system is further configured to display an indicator with a media program recommendation; one or more non-third-party originated information items are displayed for the media program recommendation; the indicator indicates a third-party originated information item for the media program recommendation.

In an embodiment, the plurality of media program recommendations comprises one or more media program recommendations for media programs accessible through a channel line-up specific to a user.

In an embodiment, the plurality of media program recommendations comprises one or more media program recommendations for media programs accessible through an internet content provider.

Figure 14B:
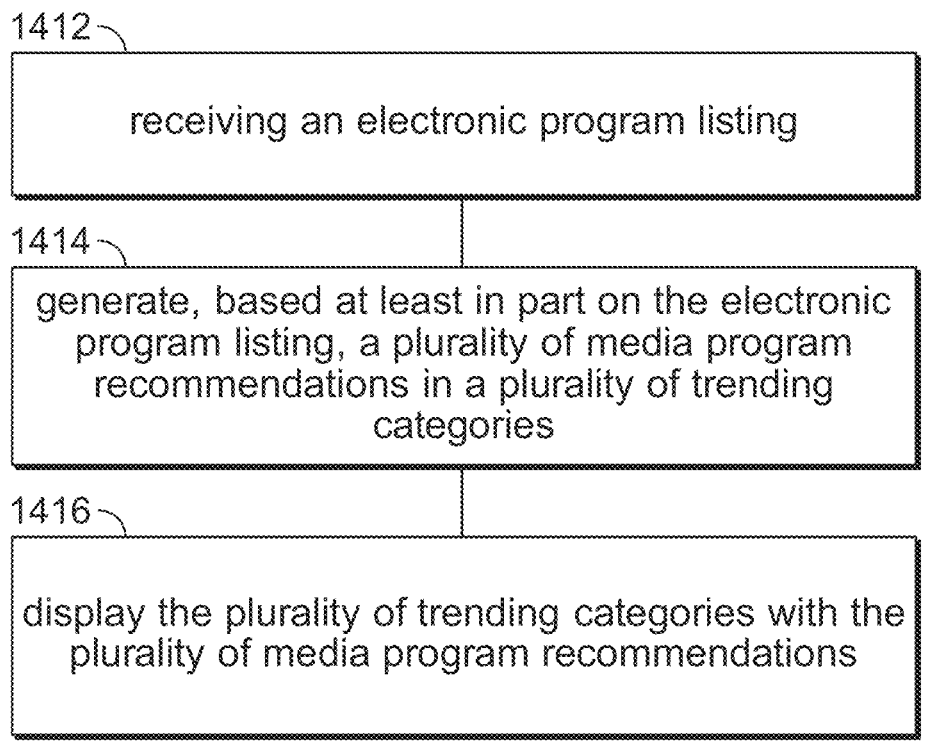

FIG. 14B illustrates an example process flow. In some embodiments, a system (e.g., a multimedia device 100, a client device 106, or a display unit 102-1 of FIG. 1, etc.) comprising one or more computing devices (e.g., 1300 of FIG. 13) may perform this process flow.

In block 1412, the system receives an electronic program listing.

In block 1414, the system generates, based at least in part on the electronic program listing, a plurality of media program recommendations in a plurality of trending categories, each trending category trending media programs having one or more common trending characteristics, and each trending category in the plurality of trending categories comprising one or more media program recommendations in the plurality of media program recommendations.

In block 1414, the system displays the plurality of trending categories with the plurality of media program recommendations.

In an embodiment, the electronic program listing is either from a service or from one or more local media sources.

In an embodiment, the system is further configured to perform: receiving a list of recorded media programs from one or more local media sources; generating, based on the list of recorded media programs, one or more media program recommendations in an trending category in the plurality of trending categories.

Figure 14C:
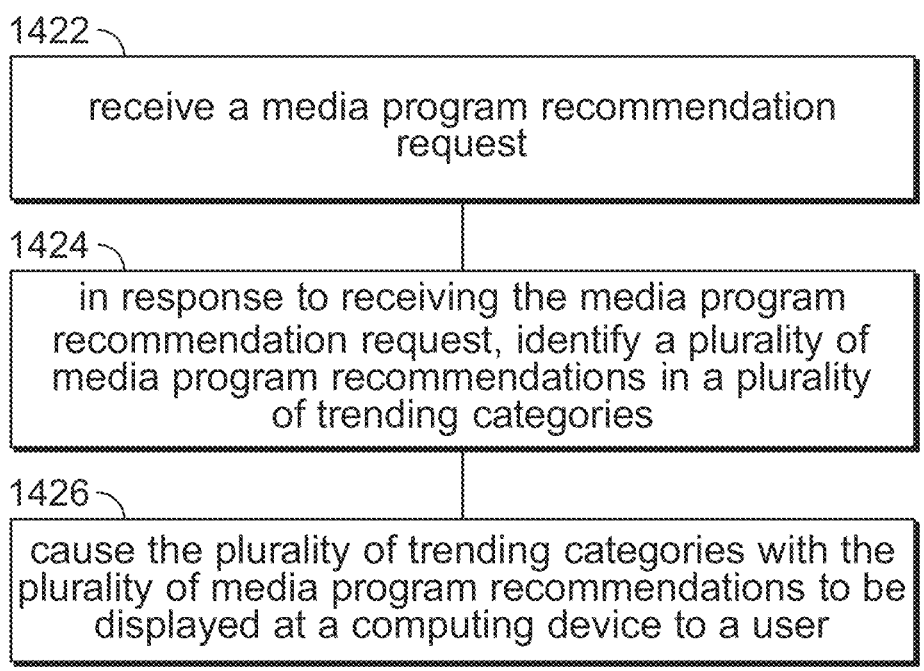

FIG. 14C illustrates an example process flow. In some embodiments, a system (e.g., a media program source 101, a program trending server 103, a network 104, or a program schedule source 105 of FIG. 1, etc.) comprising one or more computing devices (e.g., 1300 of FIG. 13) may perform this process flow.

In block 1422, the system receives a media program recommendation request.

In block 1424, the system identifies, in response to receiving the media program recommendation request, a plurality of media program recommendations in a plurality of trending categories, the plurality of media program recommendations being selected based at least in part on the electronic program listing, each trending category trending media programs having one or more common trending characteristics, and each trending category in the plurality of trending categories comprising one or more media program recommendations in the plurality of media program recommendations.

In block 1426, the system causes the plurality of trending categories with the plurality of media program recommendations to be displayed at a computing device to a user.

In an embodiment, a method as described herein is performed at least in part by a remote service to the computing device.

In an embodiment, a method as described herein is performed at least in part by one or more local sources locally connected to the computing device.

Embodiments include an apparatus comprising a processor and configured to perform any one of the foregoing methods. Embodiments include a computer readable storage medium, storing software instructions, which when executed by one or more processors cause performance of any one of the foregoing methods.

Note that, although separate embodiments are discussed herein, any combination of embodiments and/or partial embodiments discussed herein may be combined to form further embodiments.

12.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 13 is a block diagram that illustrates a computer system 1300 upon which an embodiment of the invention may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk, optical disk, or solid-state drive is provided and coupled to bus 1302 for storing information and instructions.

Computer system 1300 may be coupled via bus 1302 to a display 1312, such as a cathode ray tube (CRT), LCD monitor, LED monitor, etc., for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1310. Volatile media includes dynamic memory, such as main memory 1306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid-state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    determining a first category of trending media content items, wherein the first category corresponds to a content type;
    retrieving a user's viewing preference for a particular category of media content items, wherein the particular category corresponds to a content characteristic;
    in response to retrieving the user's viewing preference for the particular category of media content items, selecting a first portion of media content items from the first category of trending media content items based on the user's viewing preference, wherein the first selected portions of media content items correspond to the particular category;
    generating, for display at a computing device, identifiers for the first selected portion of media content items along with first information identifying the first category of trending media content items;
    causing an overlay comprising a plurality of selectable genre identifiers to be displayed, wherein causing the overlay to be displayed comprises:

determining whether the computing device comprises a display of a relatively smaller size or a display of a relatively larger size;

in response to determining that the computing device comprises a display of a relatively smaller size, causing the overlay to be of a first size and causing the overlay of the first size to obscure each of the displayed identifiers for the first selected portion of media content items; and in response to determining that the computing device comprises a display of a relatively larger size, causing the overlay to be of a second size, wherein a first ratio of the first size to a size of the display of the computing device of the relatively smaller size exceeds a second ratio of the second size to a size of the display of the computing device of the relatively larger size;

filtering the first selected portions of media content items based on a genre corresponding to a particular genre identifier, of the plurality of selectable genre identifiers, that is selected via a user interface; and generating for display at the computing device, the filtered portion of media content items for the first category of trending media content items, along with the first information.

2. The method of claim 1, wherein the user's viewing preference is determined based on a comment received via the user interface.

3. The method of claim 2, wherein the comment is received via selection of a control via the user interface.

4. The method of claim 1, wherein determining the first category of trending media content items comprises determining a streamed viewing history of media content items.

5. The method of claim 1, wherein selecting the first portions of media content items further comprises:
accessing a database of a plurality of user profiles;
identifying, in the database, a user profile;
retrieving preference data comprising the user's viewing preference from the user profile; and
in response to retrieving the preference data from the user profile, selecting the first portion of media content items from the first category of trending media content items based on the preference data from the user profile.

6. The method of claim 1, wherein determining the first category of trending media content items comprises determining respective popularity scores of media content items at a portion of a day.

7. The method of claim 1, wherein each of the media content items of the first selected portions is displayed with at least one respective icon which conveys information corresponding to the first category.

8. The method of claim 1, wherein the plurality of selectable genre identifiers are caused to be displayed in a list in which the plurality of selectable genre identifiers are ordered alphabetically.

9. The method of claim 1, wherein in response to determining that the computing device comprises the display of the relatively larger size, further causing the overlay of the second size to obscure at least one of the first selected portion of media content items.

10. The method of claim 9, further comprising:
generating, for simultaneous display at the computing device with the identifiers for the first selected portion of media content items, identifiers for media content items of a second category of trending media content items, wherein the overlay does not obscure the identifiers for the media content items of the second category.

11. The method of claim 10, further comprising:
generating, for simultaneous display at the computing device with the identifiers for the first selected portion of media content items and the identifiers for media content items of the second category, identifiers for media content items of a third category of trending media content items, wherein the overlay does not obscure the identifiers for the media content items of the second category or the identifiers for the media content items of the third category.

12. A system comprising:
a computer memory storing instructions; and
control circuitry configured to execute the instructions stored in the computer memory to:
determine a first category of trending media content items, wherein the first category corresponds to a content type;
retrieve a user's viewing preference for a particular category of media content items, wherein the particular category corresponds to a content characteristic;
in response to retrieving the user's viewing preference for the particular category of media content items, select a first portion of media content items from the first category of trending media content items based on the user's viewing preference, wherein the first selected portions of media content items correspond to the particular category;
generate, for display at a computing device, identifiers for the first selected portion of media content items along with first information identifying the first category of trending media content items;
cause an overlay comprising a plurality of selectable genre identifiers to be displayed, wherein causing the overlay to be displayed comprises:
determining whether the computing device comprises a display of a relatively smaller size or a display of a relatively larger size;
in response to determining that the computing device comprises a display of a relatively smaller size, causing the overlay to be of a first size and causing the overlay of the first size to obscure each of the displayed identifiers for the first selected portion of media content items; and
in response to determining that the computing device comprises a display of a relatively larger size, causing the overlay to be of a second size,
wherein a first ratio of the first size to a size of the display of the computing device of the relatively smaller size exceeds a second ratio of the second size to a size of the display of the computing device of the relatively larger size;
filter the first selected portions of media content items based on a genre corresponding to a particular genre identifier, of the plurality of selectable genre identifiers, that is selected via a user interface; and
generate, for display at the computing device, the filtered portion of media content items for the first category of trending media content items, along with the first information.

13. The system of claim 12, wherein the control circuitry is further configured to determine the user's viewing preference based on a comment received via the user interface.

14. The system of claim 13, wherein the control circuitry is further configured to receive the comment via selection of a control via the user interface.

15. The system of claim 12, wherein the control circuitry is further configured to determine the first category of trending media content items based on determining a streamed viewing history of media content items.

16. The system of claim 12, wherein the control circuitry is configured to select the first portions of media content items by:
accessing a database of a plurality of user profiles;
identifying, in the database, a user profile;
retrieving preference data comprising the user's viewing preference from the user profile; and
in response to retrieving the preference data from the user profile, selecting the first portion of media content items from the first category of trending media content items based on the preference data from the user profile.

17. The system of claim 12, wherein the control circuitry is configured to determine the first category of trending media content items by determining respective popularity scores of media content items at a portion of a day.

18. The system of claim 12, wherein each of the media content items of the first selected portions is displayed with at least one respective icon which conveys information corresponding to the first category.

19. The system of claim 12, wherein the plurality of selectable genre identifiers are caused to be displayed in a list in which the plurality of selectable genre identifiers are ordered alphabetically.

20. A system comprising:
means for determining a first category of trending media content items, wherein the first category corresponds to a content type;
means for retrieving a user's viewing preference for a particular category of media content items, wherein the particular category corresponds to a content characteristic;
means for, in response to retrieving the user's viewing preference for the particular category of media content items, selecting a first portion of media content items from the first category of trending media content items based on the user's viewing preference, wherein the first selected portions of media content items correspond to the particular category;
means for generating for display at a computing device, identifiers for the first selected portion of media content items along with first information identifying the first category of trending media content items;
means for causing an overlay comprising a plurality of selectable genre identifiers to be displayed, wherein the means for causing the overlay to be displayed comprises:
means for determining whether the computing device comprises a display of a relatively smaller size or a display of a relatively larger size;
means for, in response to determining that the computing device comprises a display of a relatively smaller size, causing the overlay to be of a first size and causing the overlay of the first size to obscure each of the displayed identifiers for the first selected portion of media content items; and
means for, in response to determining that the computing device comprises a display of a relatively larger size, causing the overlay to be of a second size,
wherein a first ratio of the first size to a size of the display of the computing device of the relatively smaller size exceeds a second ratio of the second size to a size of the display of the computing device of the relatively larger size;
means for filtering the first selected portions of media content items based on a genre corresponding to a particular genre identifier, of the plurality of selectable genre identifiers, that is selected via a user interface; and
means for generating, for display at the computing device, the filtered portion of media content items for the first category of trending media content items, along with the first information.

21. The system of claim 20, wherein the user's viewing preference is determined based on a comment received via the user interface.

22. The system of claim 21, wherein the comment is received via selection of a control via the user interface.

23. The system of claim 20, wherein the means for determining the first category of trending media content items comprises means for determining a streamed viewing history of media content items.

24. The system of claim 20, wherein the means for selecting the first portions of media content items further comprises:
means for accessing a database of a plurality of user profiles;
means for identifying, in the database, a user profile;
means for retrieving preference data comprising the user's viewing preference from the user profile; and
means for, in response to retrieving the preference data from the user profile, selecting the first portion of media content items from the first category of trending media content items based on the preference data from the user profile.

25. The system of claim 20, wherein the means for determining the first category of trending media content items comprises means for determining respective popularity scores of media content items at a portion of a day.

26. The system of claim 20, wherein each of the media content items of the first selected portions is displayed with at least one respective icon which conveys information corresponding to the first category.

27. The system of claim 20, wherein the plurality of selectable genre identifiers are caused to be displayed in a list in which the plurality of selectable genre identifiers are ordered alphabetically.

* * * * *